US012510400B1

(12) United States Patent
Hazlett et al.

(10) Patent No.: US 12,510,400 B1
(45) Date of Patent: Dec. 30, 2025

(54) PATIENT WEIGHING SYSTEM FOR A PATIENT TRANSPORT DEVICE

(71) Applicant: Hinckley Medical, Inc., Lakeville, MN (US)

(72) Inventors: Tristen Hazlett, Lakeville, MN (US); Colton Hazlett, Lakeville, MN (US); Michael Elsbernd, Lakeville, MN (US)

(73) Assignee: Hinckley Medical, Inc., Lakeville, MN (US)

( * ) Notice: Subject to any disclaimer, the term of this patent is extended or adjusted under 35 U.S.C. 154(b) by 101 days.

(21) Appl. No.: 18/615,235

(22) Filed: Mar. 25, 2024

Related U.S. Application Data

(63) Continuation-in-part of application No. 17/843,450, filed on Jun. 17, 2022, now Pat. No. 12,117,334.

(60) Provisional application No. 63/454,169, filed on Mar. 23, 2023, provisional application No. 63/212,399, filed on Jun. 18, 2021.

(51) Int. Cl.
*G01G 19/44* (2006.01)
*A61G 7/05* (2006.01)
*G01G 19/52* (2006.01)

(52) U.S. Cl.
CPC ......... *G01G 19/445* (2013.01); *A61G 7/0527* (2016.11); *G01G 19/52* (2013.01)

(58) Field of Classification Search
CPC ...... G01G 19/44; G01G 19/445; G01G 19/52; G01G 23/18; A61G 7/0527; A61G 2203/44
USPC ..................................... 5/611; 177/132, 144
See application file for complete search history.

(56) References Cited

U.S. PATENT DOCUMENTS

| | | | | |
|---|---|---|---|---|
| 4,258,814 A * | 3/1981 | Dillon | ...................... | G01G 3/12 177/126 |
| 4,363,368 A * | 12/1982 | Paddon | ................ | G01G 19/445 177/144 |
| 4,793,428 A * | 12/1988 | Swersey | ................ | G01G 21/24 177/144 |
| 5,861,582 A * | 1/1999 | Flanagan | ............. | G01G 19/445 177/144 |
| 6,469,263 B1 * | 10/2002 | Johnson | ............... | G01G 19/445 177/144 |
| 6,680,442 B1 * | 1/2004 | Rynd | .................... | G01G 19/445 177/144 |
| 7,199,311 B1 | 4/2007 | Buckner et al. | | |
| 7,282,652 B1 * | 10/2007 | Johnson | ............... | G01G 19/445 177/144 |
| 9,009,891 B2 * | 4/2015 | Receveur | ................. | A61G 5/00 5/713 |

(Continued)

FOREIGN PATENT DOCUMENTS

| KR | 101725006 B1 | 4/2017 |
|---|---|---|
| WO | 2021108377 A1 | 6/2021 |

*Primary Examiner* — David R Hare
(74) *Attorney, Agent, or Firm* — Suiter Swantz IP

(57) ABSTRACT

A patient weighing system includes a set of overlays configured to cover a top face of a patient transport device. At least one overlay of the set of overlays may be configured to actuate between at least a flat position and an inclined position. The system may further include a set of attachment sub-systems configured to couple each overlay to the top face of the patient transport device. The system may further include a set of sensor sub-systems including a load cell and a shear load cell. Each set of sensor sub-systems may be configured to measure a weight of a portion of a patient's body.

20 Claims, 22 Drawing Sheets

(56) References Cited

U.S. PATENT DOCUMENTS

| | | | |
|---|---|---|---|
| 10,292,605 B2* | 5/2019 | Vanderpohl, III | A61B 5/1102 |
| 10,314,754 B2 | 6/2019 | Karwal et al. | |
| 10,357,185 B2* | 7/2019 | Kostic | A61B 5/6892 |
| 10,376,214 B2* | 8/2019 | Hayes | A61G 7/0509 |
| 10,768,040 B2 | 9/2020 | Taylor et al. | |
| 10,959,891 B1* | 3/2021 | Mooney | A61G 1/04 |
| 12,117,334 B1* | 10/2024 | Hazlett | G01G 19/445 |
| 12,251,345 B2* | 3/2025 | Cerny | A61G 7/015 |
| 2008/0169931 A1* | 7/2008 | Gentry | A61B 5/1117 |
| | | | 600/300 |
| 2008/0172789 A1* | 7/2008 | Elliot | A61G 7/0527 |
| | | | 5/616 |
| 2011/0302720 A1* | 12/2011 | Yakam | A47C 27/082 |
| | | | 177/144 |
| 2012/0259378 A1 | 10/2012 | Heinrichs et al. | |
| 2017/0224560 A1* | 8/2017 | Meyer | A47C 27/088 |
| 2020/0330299 A1 | 10/2020 | Heneveld, Jr. et al. | |
| 2021/0030611 A1* | 2/2021 | Shiery | A61G 7/0527 |
| 2021/0298682 A1* | 9/2021 | Hayes | A61B 5/024 |
| 2021/0298683 A1 | 9/2021 | Jung et al. | |

* cited by examiner

900

PATIENT WEIGHING SYSTEM FOR A PATIENT TRANSPORT DEVICE

CROSS-REFERENCE TO RELATED APPLICATIONS

The present application is a continuation-in-part of U.S. patent application Ser. No. 17/843,450, filed Jun. 17, 2022, which claims the benefit under 35 U.S.C § 119(e) of U.S. Provisional Patent Application No. 63/212,399, filed Jun. 18, 2022, the present application also claims the benefit under 35 U.S.C § 119(e) of U.S. Provisional Patent Application No. 63/454,169, filed Mar. 23, 2023, all of which are incorporated herein by reference in their entirety.

TECHNICAL FIELD

The present disclosure generally relates to the field of weight measurement systems, and more particularly to, a patient weighing system for a patient transport device.

BACKGROUND

Medical professionals often need to get a precise weight measurement. This is often difficult to do in emergency medical settings or other hospital settings due to the condition of the patient, the condition of the environment, time restraints, or the like. There is a need to provide accurate weight measurements to reduce/eliminate medication dosing errors due to inaccurate weight and medication calculation, particularly among pediatric patients and unconscious patients.

SUMMARY

In some aspects, the techniques described herein relate to a patient weighing system, the patient weighing system including: a set of overlays configured to cover a top face of a patient transport device, at least one overlay of the set of overlays configured to actuate between a flat position and an inclined position; a set of attachment sub-systems, each attachment sub-system of the set of attachment sub-systems configured to couple each overlay of the set of overlays to the top face of the patient transport device; a set of sensor sub-systems, each overlay of the set of overlays including at least one set of sensor sub-systems arranged on a bottom face of each overlay of the set of overlays, each sensor sub-system of the set of sensor sub-systems including at least one load cell, the at least one load cell configured to electrically couple to at least one voltage amplification board, the set of sensor sub-systems further including at least one shear load cell coupled to the at least one overlay configured to actuate between the flat position and the inclined position, the at least one load cell communicatively coupled to the at least one shear load cell, the at least one shear load cell configured to measure a weight of a portion of a patient's body when the at least one overlay is in the inclined position, the at least one load cell configured to measure a weight of a portion of a patient's body on at least one additional overlay in a flat position; a user interface device including a display; and a controller communicatively coupled to each sensor sub-system of the set of sensor sub-systems and the user interface device, the controller including one or more processors configured to execute a set of program instructions stored in a memory, the set of program instructions configured to cause the one or more processors to: receive at least a first weight corresponding to a first portion of a patient's body from the at least one load cell of the at least one additional overlay in the flat position; receive at least an additional weight corresponding to an additional portion of a patient's body from the at least one shear load cell of the at least one overlay in the inclined position; calculate a total patient weight by summing the received first weight and received additional weight; and generate one or more control signals configured to cause the display of the user interface device to display the calculated total patient weight.

In some aspects, the techniques described herein relate to a patient weighing system, the patient weighing system including: a set of overlays configured to cover a top face of a patient transport device, at least one overlay of the set of overlays configured to actuate between a flat position and an inclined position; a set of attachment sub-systems, each attachment sub-system of the set of attachment sub-systems configured to couple each overlay of the set of overlays to the top face of the patient transport device; a set of sensor sub-systems, each overlay of the set of overlays including at least one set of sensor sub-systems arranged on a bottom face of each overlay of the set of overlays, each sensor sub-system of the set of sensor sub-systems including at least one load cell, the at least one load cell configured to electrically couple to at least one voltage amplification board, the set of sensor sub-systems further including at least one shear load cell coupled to the at least one overlay configured to actuate between the flat position and the inclined position, the at least one load cell communicatively coupled to the at least one shear load cell, the at least one shear load cell configured to measure a weight of a portion of a patient's body when the at least one overlay is in the inclined position, the at least one load cell configured to measure a weight of a portion of a patient's body on at least one additional overlay in a flat position In some aspects, the techniques described herein relate to a patient weighing system, the patient weighing system including: an overlay configured to cover a top face of a patient transport device, the overlay configured to actuate between a flat position and an inclined position; a set of attachment sub-systems, each attachment sub-system of the set of attachment sub-systems configured to couple the overlay to the top face of the patient transport device; a set of sensor sub-systems, the overlay including at least one set of sensor sub-systems arranged on a bottom face of each overlay of the set of overlays, each sensor sub-system of the set of sensor sub-systems including at least one load cell, the at least one load cell configured to electrically couple to at least one voltage amplification board, the set of sensor sub-systems further including at least one shear load cell coupled to the at least one overlay configured to actuate between the flat position and the inclined position, the at least one load cell communicatively coupled to the at least one shear load cell; a user interface device including a display; and a controller communicatively coupled to each sensor sub-system of the set of sensor sub-systems and the user interface device, the controller including one or more processors configured to execute a set of program instructions stored in a memory, the set of program instructions configured to cause the one or more processors to: receive a patient weight of a patient's body from the at least one load cell and the at least one shear load cell; and generate one or more control signals configured to cause the display of the user interface device to display the calculated patient weight.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
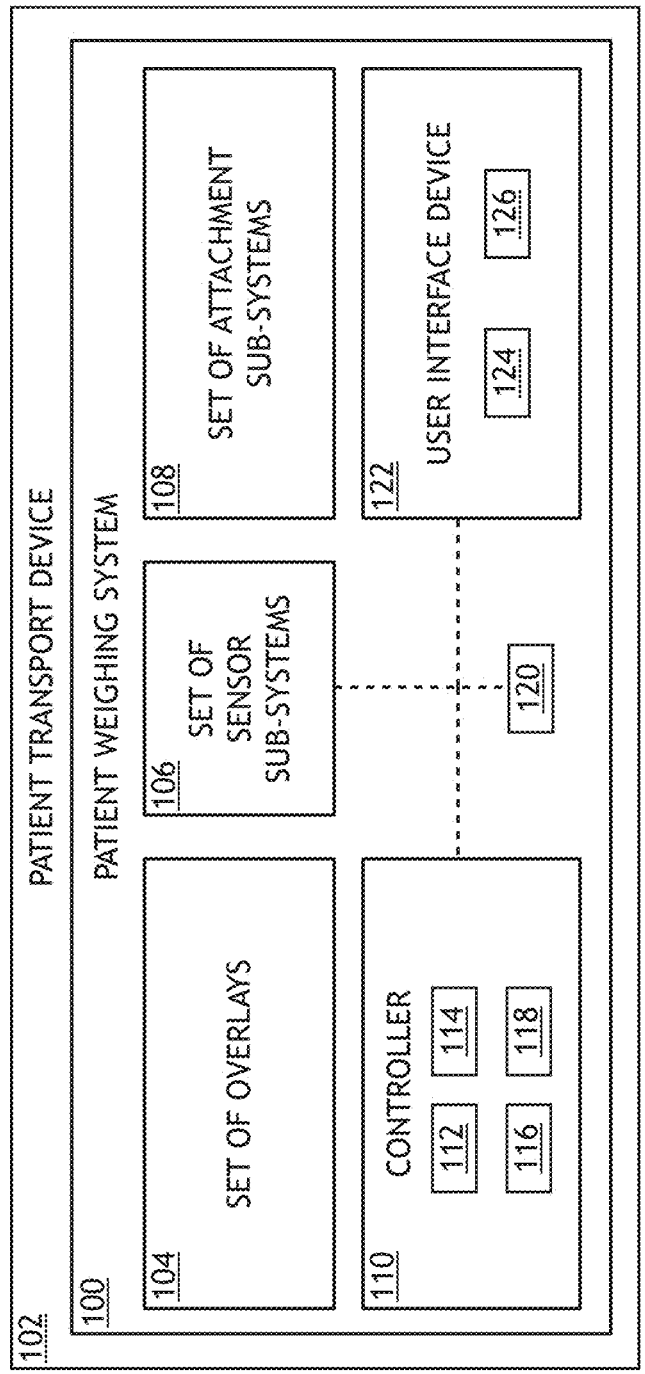
FIG. 1A illustrates a simplified block diagram of a patient transport device including a patient weighing assembly, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Medical professionals need to get a precise weight measurement. This is often difficult to do in emergency medical settings or other hospital settings due to the condition of the patient, the condition of the environment, time restraints, or the like. For example, prehospital dosing errors in pediatric patients affects approximately 56,000 U.S. children annually. A survey indicated that the underlying cause of prehospital medication errors included, weight estimation errors, problematic references, and calculation errors. By way of another example, in stroke patients that survival rate is dependent on a timely and effective treatment process. An accurate weight is needed in a timely manner without the need to transfer the patient away from the patient transport device. By way of another example, in the Air Emergency Medical Services Industry knowledge of accurate patient weight is vital to safe air medical transport and critical care. Patient weight is often unknown in emergency settings, and visual estimations have been shown to be inaccurate, especially in obese patients. Due to most air EMS usage of helicopters to quickly transport patients in need of medical treatment, knowledge of the weight is even more essential. This is due to the operation of the helicopter itself as the weight of the load in the helicopter prior to takeoff is vital information the pilot needs to safely transport the patients.

In addition, in select industries the build of the patient transport device (and any included components within the build) may be required to meet guidelines and/or standards. For example, patient transport devices (and any included components) may be required to meet patient transport safety guidelines and/or standards. For instance, the select patient transport may need to be configured in accordance with patient transport safety guidelines and/or standards put forth by, but not limited to, the Society of Automotive Engineers (SAE), Ambulance Manufacturers Division (AMD), or any other standards setting organization or company. Patient weighing systems for patient transport devices may present difficulties such as, but not limited to, failing to meet vertical component retention static test requirements, or the like as set forth by the AMD in AMD Standard 028, VERTICAL COMPONENT RETENTION-STATIC TEST-2019. Further, Patient weight systems for patient transport devices may present difficulties such as, but not limited to, failing to meet ambulance equipment mount device or systems requirements, or the like as set forth by the SAE in J3043_201407, AMBULANCE EQUIPMENT MOUNT DEVICE OF SYSTEMS.

As such, it would be desirable to provide a patient weighing system for a patient transport device. The patient weighing system should be configured to calculate an accurate patient weight. For example, the patient weighing system should be configured to allow medical professionals to calculate a precise weight, such that the medical professional is able to obtain a precise weight-based dosage. The patient weighing system should be configured in accordance with patient transport guidelines and/or standards.

Figure 1B:
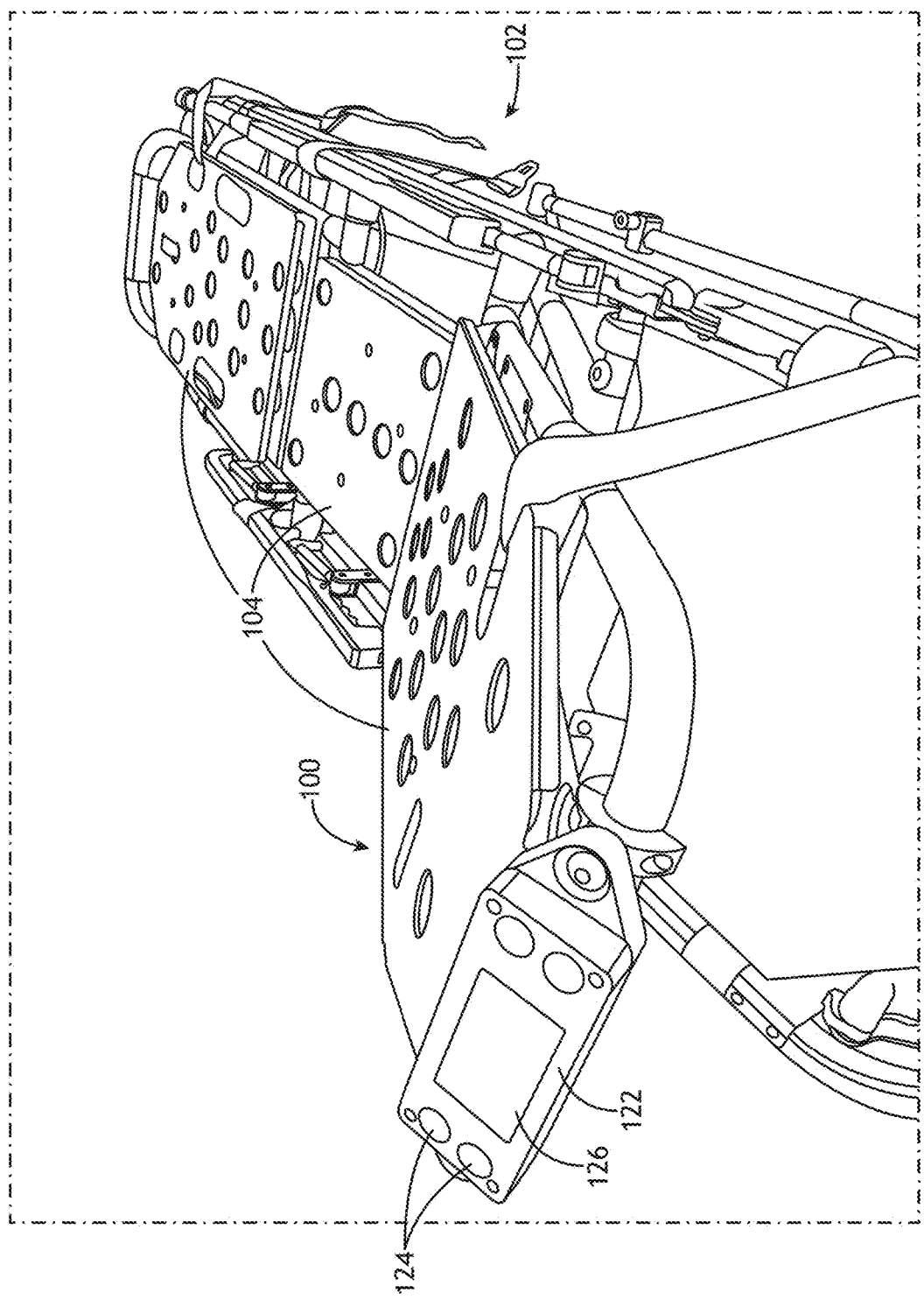
FIG. 1B illustrates a schematic view of a patient transport device including a patient weighing assembly, in accordance with one or more embodiments of the present disclosure.
Figure 2A:
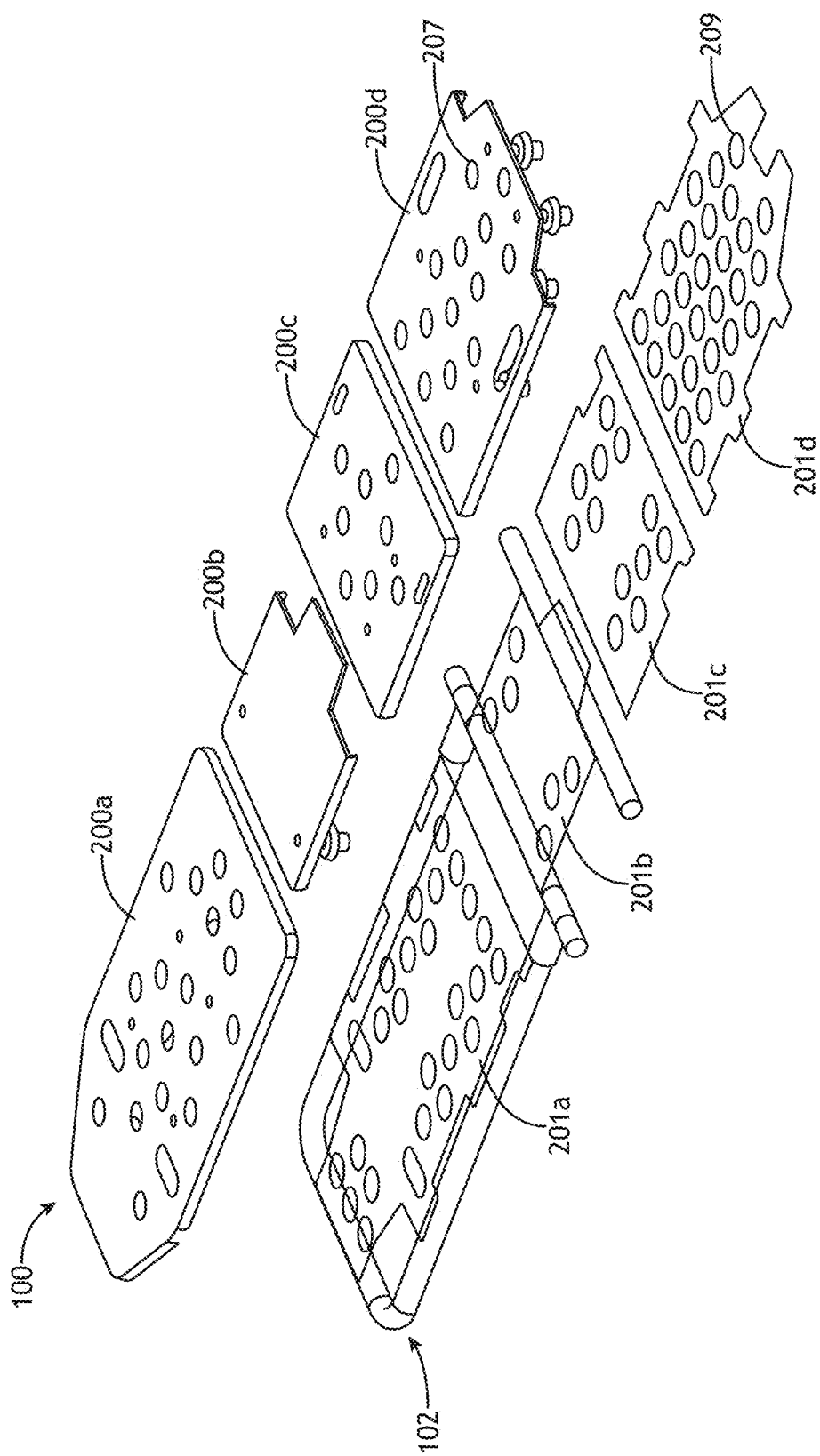
FIG. 2A illustrates an exploded view of a patient transport device including a patient weighing system, in accordance with one or more embodiments of the present disclosure.
Figure 2B:
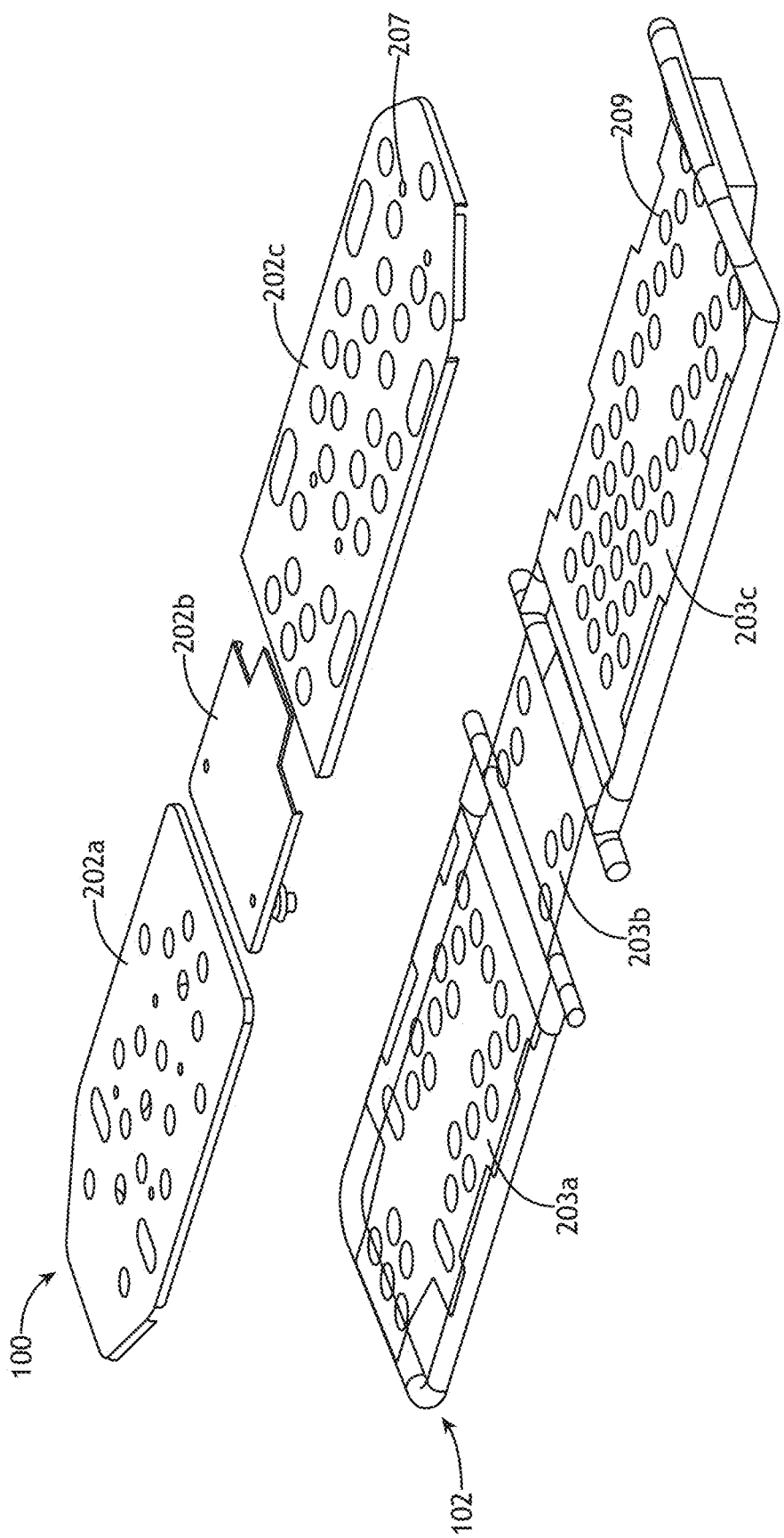
FIG. 2B illustrates an exploded view of a patient transport device including a patient weighing system, in accordance with one or more embodiments of the present disclosure.
Figure 2C:
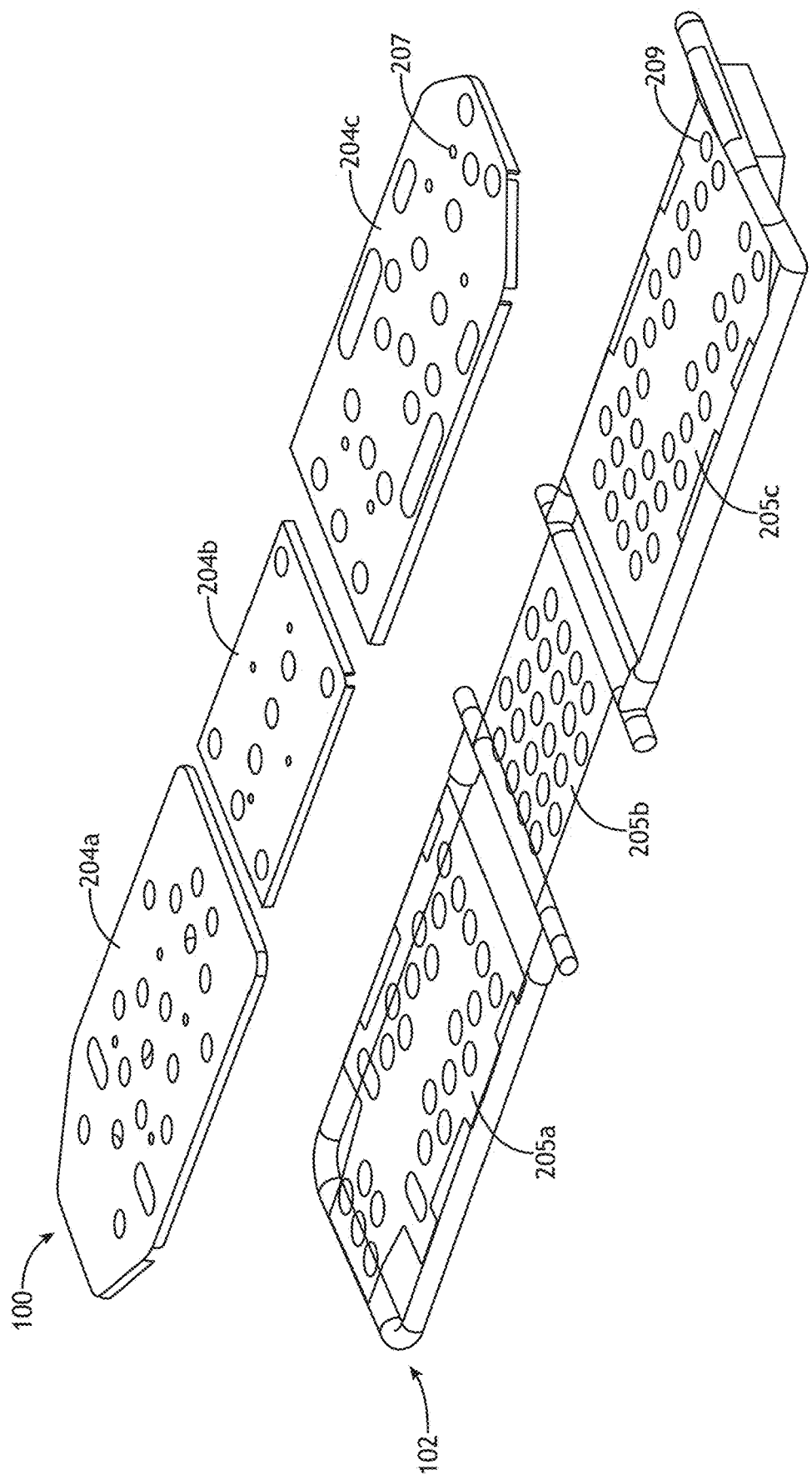
FIG. 2C illustrates an exploded view of a patient transport device including a patient weighing system, in accordance with one or more embodiments of the present disclosure.

FIG. 1A illustrates a simplified block diagram a patient weighing system 100 for a patient transport device 102, in accordance with one or more embodiments of the present disclosure. FIG. 1B illustrates a schematic view of the patient transport device 102 including the patient weighing system 100, in accordance with one or more embodiments of the present disclosure. FIGS. 2A-2C illustrate exploded views of the patient weighing system 100 for the patient transport device 102, in accordance with one or more embodiments of the present disclosure.

The patient weighing system 100 may include a set of overlays 104. For example, as shown in FIG. 2A, the patient weighing system 100 may include a first overlay, a second overlay, a third overlay, and a fourth overlay. For instance, the set of overlays 104 may include a top overlay 200a, a knee catch overlay 200b, a middle overlay 200c, and a bottom overlay 200d. By way of another example, as shown in FIG. 2B, the patient weighing system 100 may include a first overlay, a second overlay, and a third overlay. For instance, the patient weighing system 100 may include a top overlay 202a, a knee catch overlay 202b, and a bottom overlay 202c. By way of another example, as shown in FIG. 2C, the patient weighing system 100 may include a first overlay 204a, a second overlay 204b, and a third overlay 204c. For instance, the patient weighing system 100 may include a top overlay 204a, a middle overlay 204b, and a bottom overlay 204c. Although FIGS. 2A-2C illustrate a specific configuration (e.g., layout, number, or the like) of overlays 200a-204c, it is noted herein that the patient weighing system 100 may include any configuration of overlays (e.g., layout, number, or the like). Further, although FIGS. 2A-2C illustrate multiple overlays 200a-204c, it is noted that the system 100 may include a single overlay configured to cover a top face of the patient transport device 102. FIGS. 2A-2C are provided merely for illustrative purposes and therefore should not be construed as limiting the scope of the present disclosure.

Each overlay of the set of overlays 104 may be formed of any material known in the art suitable for providing support such as, but not limited to, steel, aluminum, titanium, platinum, or the like. As shown in FIG. 1B, each overlay of the set of overlays 104 may be configured to couple to one or more portions of the patient transport device 102 (via an attachment sub-system 108), which is discussed further herein. Further, in some embodiments, a top face of the set of overlays may be configured to receive a bottom portion of a cushion of the patient transport device, such that the overlay is positioned between the frame of the patient transport device 102 and the cushion of the patient transport device 102. For purposes of the present disclosure, the patient weighing system 100 may be configured for use with any patient transport device. For example, the patient transport device 102 may include, but is not limited to, a gurney (e.g., a patient transport device with wheels), a stretcher (e.g., patient transport device without wheels), or the like. Further, the patient weighing system 100 may be used with any manufactured design type including, but not limited to, Stryker® designs, Ferno® designs, or the like. Although FIGS. 2A-2C illustrate a specific type of patient transport device 102, it is noted that the patient transport device 102 may be any size and/or shape.

Referring to FIG. 1B, the patient transport device 102 may be configured to actuate between one or more positions, which in turn may be actuate one or more of the overlays 104. For example, a frame of the patient transport device may be configured to actuate between at least an upright position and a bed position, causing the set of overlays 104 to actuate. For instance, as shown in FIG. 1B, a portion of the frame of the patient transport device 102 may be configured to actuate to cause the top overlay to be in an upright position. It is contemplated herein that although FIG. 1B depicts the top overlay being actuated to the upright (or inclined position), any of the overlays 104 of the set of overlays 104 may be configured to actuate to an upright/inclined position. Further, it is contemplated herein that the angle of incline of the respective overlay 104 may be known or may be solved for.

The patient weighing system 100 may be configured to determine a weight of a patient when in either a flat or inclined position. For example, as will be discussed further herein, the set of sensor sub-systems 106 may be configured to calculate a weight of a patient in a flat position as shown in FIGS. 2A-2C. By way of another example, as will be discussed further herein, the set of sensor sub-systems 106 may be configured to calculate a weight of a patient in a inclined position as shown in FIG. 1B.

Figure 3:
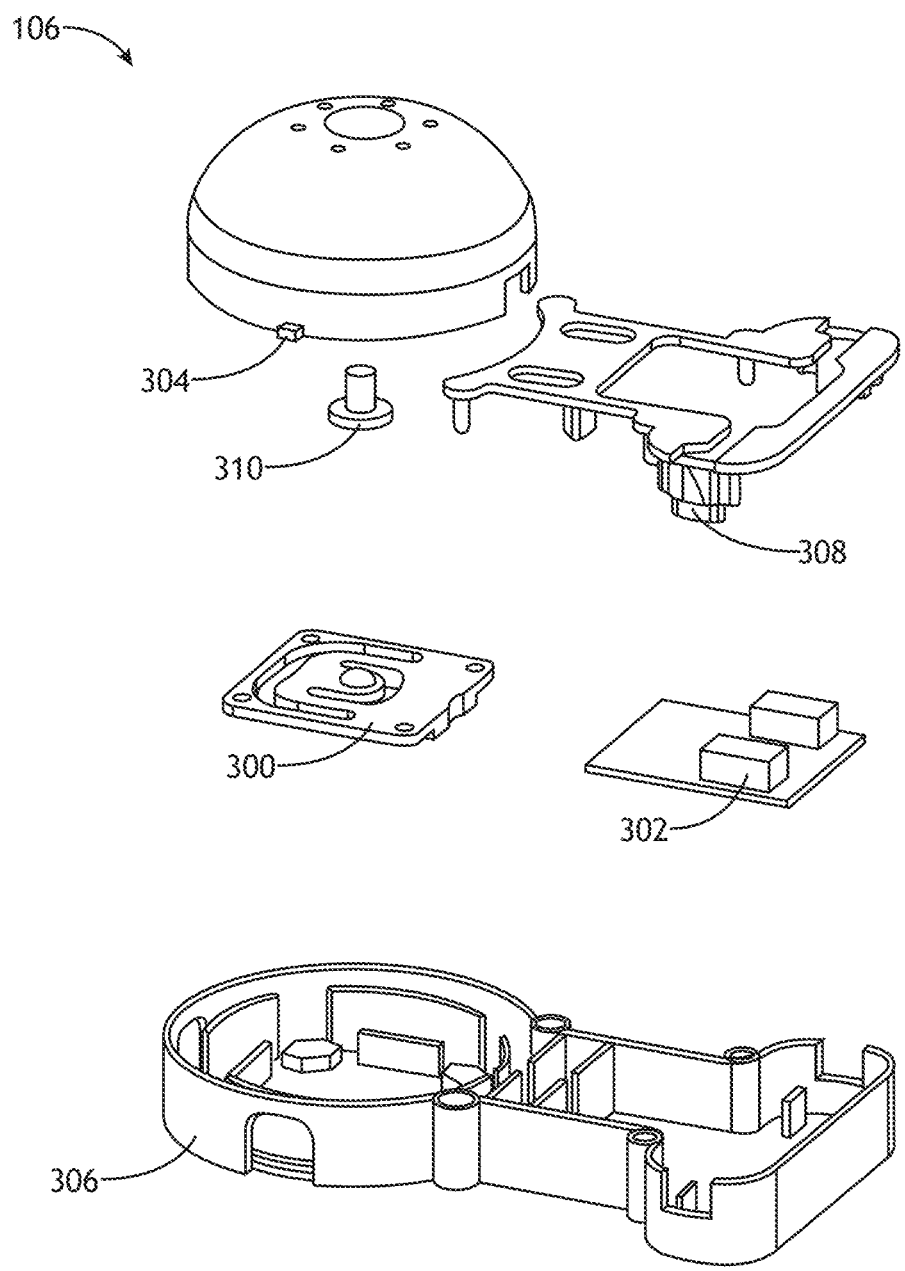
FIG. 3 illustrates an exploded view of a load sensor sub-system of the patient weighing system, in accordance with one or more embodiments of the present disclosure.

The patient weighing system 100 may include a set of sensor sub-systems 106. Referring to FIG. 3, each sensor sub-system 106 may include at least one load sensor 300. The at least one load sensor 300 may be configured to electrically couple to a voltage amplification board 302 (amp board 302). For example, the patient weighing system 100 may include a plurality of amp boards 302 configured to electrically couple to the plurality of load sensors 300, where each amp board 302 is electrically coupled to each load sensor 300. By way of another example, the patient weighing system 100 may include a single amp board 302 configured electrically coupled to the plurality of load sensors 300, where each load sensor 300 is electrically coupled to the single amp board 302.

Each sensor sub-system 106 may include a circular load cell 300 with one point of contact. For example, each load cell 300 may be configured to generate an electrical voltage when force is applied along a z-axis (e.g., to the strain gauge). In this example, the electrical voltage is amplified using a voltage amplification board 302 such that an analog to digital converter may be configured to read the input signal. Further, in this example, the input signal is used in a computer algorithm configured to correlate the generated voltage from the load cell with a patient's weight on the patient transport device 102.

The amplification board 302 may be configured to amplify the signal from the one or more load sensors 300 and compare that signal to a reference voltage derived from the main PCB. Further, the amplification board 302 may be configured to send an analog value to the main PCB. The amp board 302 may include, but is not limited to, one or more gain setting resistors, a load cell input volage, a low pass filter, one or more buffer caps, in-amp bias voltage, and a multidrop slave side interface.

The load cell 300 and the voltage amplification board 302 may be housed in a housing assembly configured to protect the components from various external elements (e.g., dirt, water, bodily fluids, or the like). The housing assembly may include at least a first housing portion 304, a second housing portion 306, and a third housing portion 308. For example, the first housing portion 304 may include a top domed housing portion 304 configured to house at least a portion of the load cell 300 and the voltage amplified 302. By way of another example, the second housing portion 306 may include a bottom housing portion 306 configured to house at least a portion of the load cell 300 and the voltage amplified 302. By way of another example, the third housing portion 308 may include an amplification cover housing portion 306 configured to house at least a portion of the voltage amplification board 302.

The top domed housing portion 304 may have one degree of freedom along the z-axis. For example, the top domed housing portion 304 may be configured to float freely along the z-axis, limiting any friction that would cause inaccuracies in the weight calculation by the patient weighing system.

Each sensor sub-system 106 may further include a contact point/head 310. For example, the sensor sub-system 106 may include dowel pin 310. The dowel pin 310 may be configured to lock into place within the top housing portion 304. For example, the dowel pin 310 may be configured to have a firm point of contact between the top dome housing portion 304 and the load cell 300. In this regard, the dowel pin 310 may compress the load cell 300 to cause the load cell to generate an electrical voltage when force is applied along the z-axis.

The set of sensor sub-systems 106 may further include one or more additional sensors including, but not limited to, one or more location sensors (or global positioning system (GPS) sensors), one or more accelerometers, one or more inclinometers (or tilt sensors), one or more barometric sensors, one or more environmental sensors (e.g., temperature sensors, humidity sensors, or the like), one or more pressure sensors, or the like. For example, in a non-limiting example, the set of sensor sub-systems 106 may include one or more location sensors coupled to a portion of the overlays 104 or patient transport device 102 (or integrated within the user interface device 122), where the one or more location sensors are able to collect location data for the patient weighing system. In this regard, the location data may be used to monitor and analyze hospital wait times and provide dynamic real-time information sharing and coordination among emergency medical teams. As such, the real-time location data may enhance situational awareness and response efficiency. Further, the location data may be used to determine weights of people in different geographical areas to provide data analysis on the weight distribution of emergency patients across different regions, offering valuable insights for public health officials and aiding in the management of health crises. By way of another example, in a non-limiting example, the set of sensor sub-systems 106 may include one or more accelerometers coupled to a portion of the patient transport device 102 or an overlay 104, where the accelerometers collect acceleration data (i.e., changes in speed or direction). In this regard, the accelerometers may be used for crash detection to detect and respond to ambulance crashes. By way of another example, in a non-limiting example, the set of sensor sub-systems 106 may include one or more inclinometers (or tilt sensors) coupled to a portion of the patient transport device 102 or an overlay 104, where the inclinometers collects angles of slop/tilt data and elevation/depression data. In this regard, the inclinometer data may be used to allow emergency responders to know when the patient transport device 102 is at an unsafe angle/tilt which could result in the patient tipping over while strapped to the patient transport device or the patient falling off the patient transport device 102 itself. By way of another example, in a non-limiting example, the set of sensor sub-systems 106 include one or more environmental sensors coupled to the patient transport device 102 or an overlay 104, where the one or more environmental sensors collect environmental data (e.g., temperature, humidity, or the like). In this regard, the patient weighing system 100 is able to monitor and record environmental conditions during patient transport, which could impact patient care (especially those in critical conditions). By way of another example, in a non-limiting example, the set of sensor sub-systems 106 may be configured to monitor at least one of blood pressure, heart rate, or the like. In this regard, the patient weighing system 100 may integrate vital sign monitoring into the system to enable comprehensive patient monitoring directly from the patient transport device 102, thereby enhancing patient care and data collection capabilities.

Referring to FIGS. 5A-8D, each overlay of the set of overlays 104 may include a set of sensor sub-systems 106. For example, each sensor sub-system may be configured to couple to a surface (or face) of each overlay. In one instance, an underside of the bottom housing portion 306 may be configured to couple to a bottom surface (or bottom face) of the overlay. In another instance, a bottom surface of the overlay may include the bottom housing portion, such that the sensor sub-system 106 may couple directly to the bottom surface of the overlay via the integrated bottom housing portion. It is noted that the sensor sub-systems 108 may be coupled to the overlays 104 via any coupling mechanism including, but not limited to, one or more adhesives (e.g., single component epoxy adhesive, structural acrylic adhesive, two component epoxy adhesive, or the like), fasteners, rivets, or the like.

Each overlay may include at least three sets of sensor sub-systems 106 arranged on a bottom surface of each overlay. It is noted that the system may include any number of sensor sub-systems suitable for obtaining an accurate patient weight. For example, in some embodiments, each overlay may include at least four sets of sensor sub-systems 106 arranged on a bottom surface of each overlay. By of another example, in some embodiments, each overlay may include at least three sets of sensor sub-systems 106 arranged on a bottom surface of each overlay, where the three sensor sub-systems 106 make up a plane. Each sensor sub-system within the set of sensor sub-systems 106 may be communicatively coupled to each other. Further, each set of sensor sub-systems may be communicatively coupled to each other. For example, each load cell 300 may be configured to communicate with surrounding load cells. By way of another example, each set of load cells may be configured to communicate with additional sets of load cells. In this regard, sensor data (e.g., patient weight measurements, or the like) from each sensor sub-system may be communicated to other sensor sub-systems, such that a distributed patient weight may be accurately calculated.

Figure 5A:
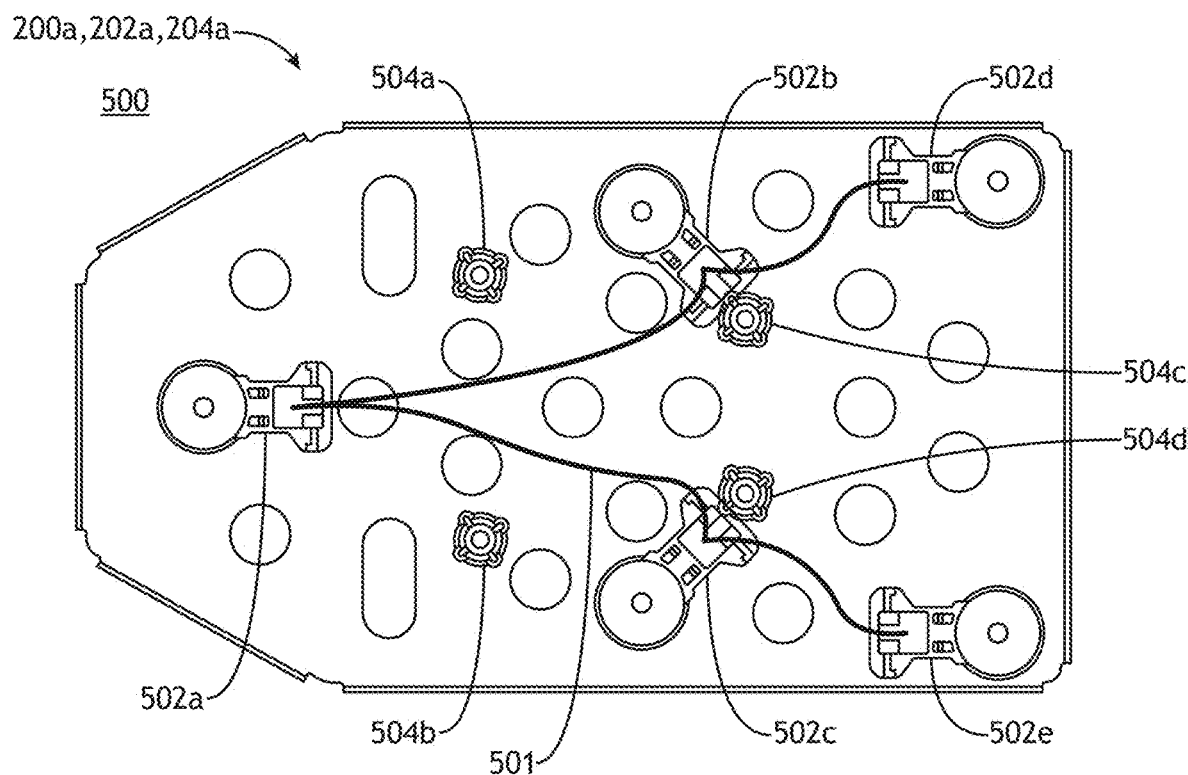
FIG. 5A illustrates a schematic view of an overlay including a set of sensor sub-systems and attachment sub-systems of the patient weighing system, in accordance with one or more embodiments of the present disclosure.

Referring to FIG. 5A, each sensor sub-system 106 of the set of sensor systems 106 may be daisy chained together. For example, the one or more wires 501 may be daisy chained from one of the one or more load cells to another and all the way to a main printed circuit board (PCB) (not shown in this figure). The one or more wires 501 may be held in place via one or more adhesives (e.g., electrical tape, or the like), one or more wire management devices, or the like. For purposes of simplicity the wires are not shown in FIGS. 5B-8D, however, FIGS. 5B-8D are provided merely for illustrative purposes and should not be construed as limiting the scope of the present disclosure.

Referring generally to FIGS. 5A-8D, the overlays 500-810 may include any configuration of sensor sub-systems 502a-812e. For example, as shown in FIGS. 5A-5B, the top overlay 500 may include at least three sensor sub-systems 106 coupled to a bottom surface of the top overlay. For instance, the top overlay 500 may include a first top overlay sensor sub-system 502a, a second top overlay sensor sub-system 502b, a third top overlay sensor sub-system 502c, a fourth top overlay sensor sub-system 502d, and a fifth top overlay sensor sub-system 502e. Each of the top overlay sensor sub-systems 502a-502e may be communicatively coupled to each other, such that each load cell of the top overlay sensor sub-systems 502a-502d may be communicatively coupled to each other.

Figure 6A:
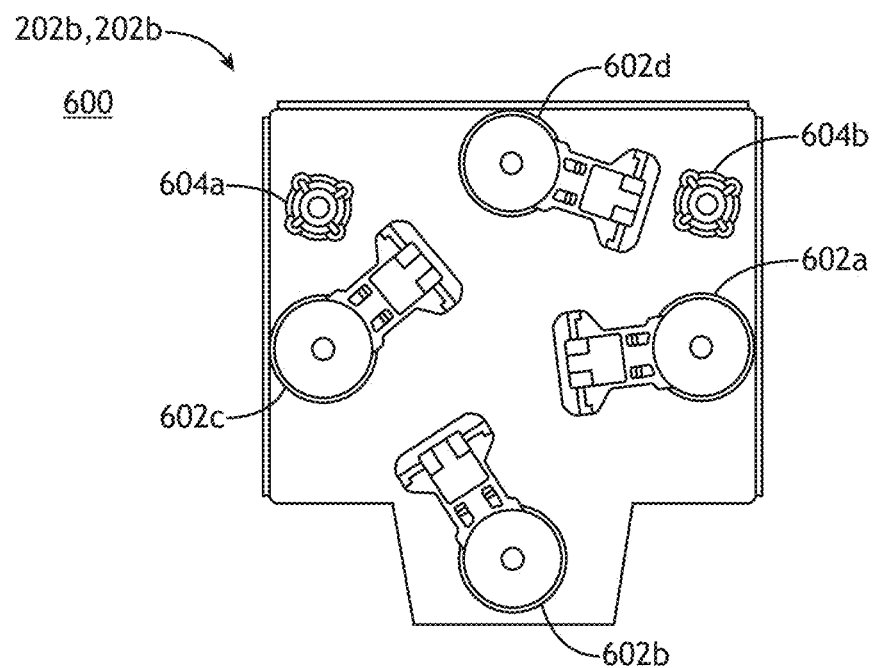
FIG. 6A illustrates a schematic view of an overlay including a set of sensor sub-systems and attachment sub-systems of the patient weighing system, in accordance with one or more embodiments of the present disclosure.
Figure 6B:
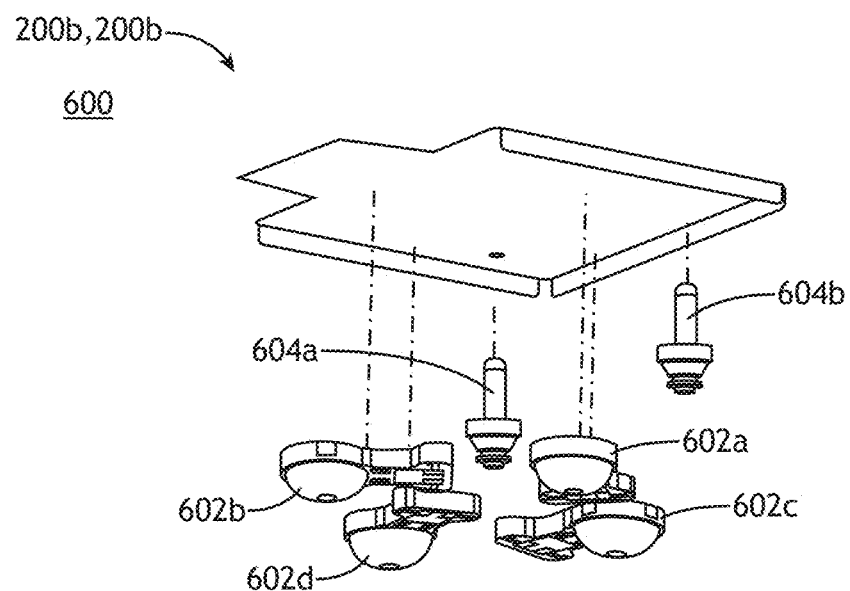
FIG. 6B illustrates a schematic view of an overlay including a set of sensor sub-systems and attachment sub-systems of the patient weighing system, in accordance with one or more embodiments of the present disclosure.

By way of another example, as shown in FIGS. 6A-6B, the knee catch overlay 600 may include at least three sensor sub-systems 106 coupled to a bottom surface of the knee catch overlay. For instance, the knee catch overlay 600 may include a first knee catch overlay sensor sub-system 602a, a second knee catch overlay sensor sub-system 602b, a third knee catch overlay sensor sub-system 602c, and a fourth knee catch overlay sensor sub-system 602d. Each of the knee catch overlay sensor sub-systems 602a-602d may be communicatively coupled to each other, such that each load cell of the knee overlay sensor sub-systems 602a-602d may be communicatively coupled to each other.

Figure 7A:
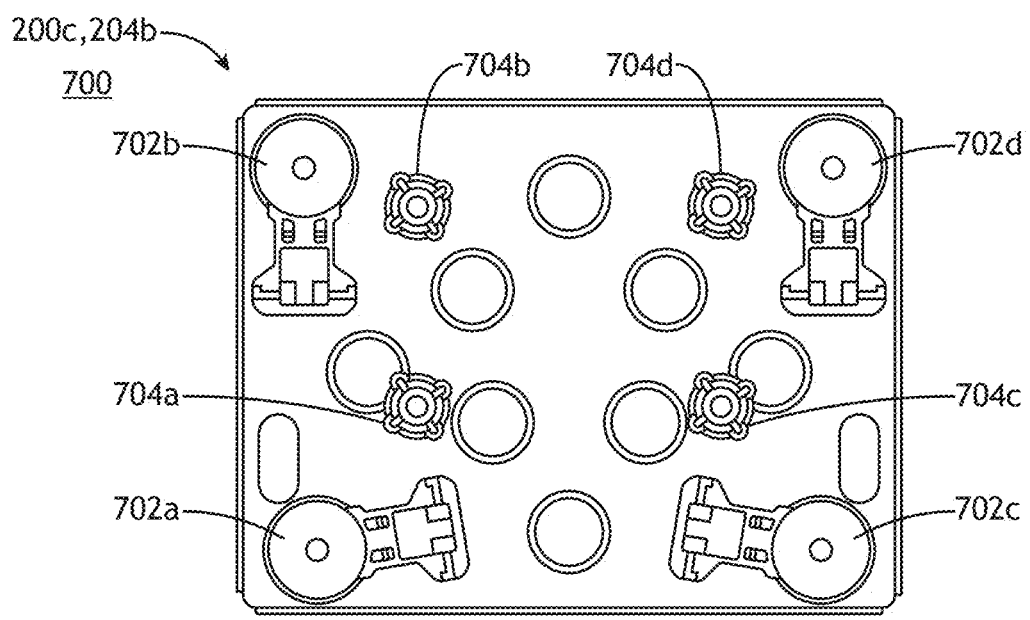
FIG. 7A illustrates a schematic view of an overlay including a set of sensor sub-systems and attachment sub-systems of the patient weighing system, in accordance with one or more embodiments of the present disclosure.
Figure 7B:
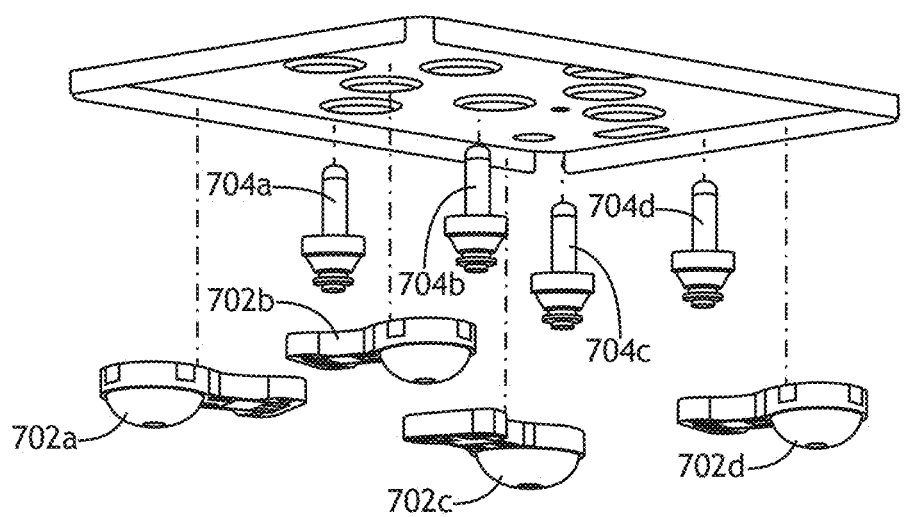
FIG. 7B illustrates a schematic view of an overlay including a set of sensor sub-systems and attachment sub-systems of the patient weighing system, in accordance with one or more embodiments of the present disclosure.
Figure 7C:
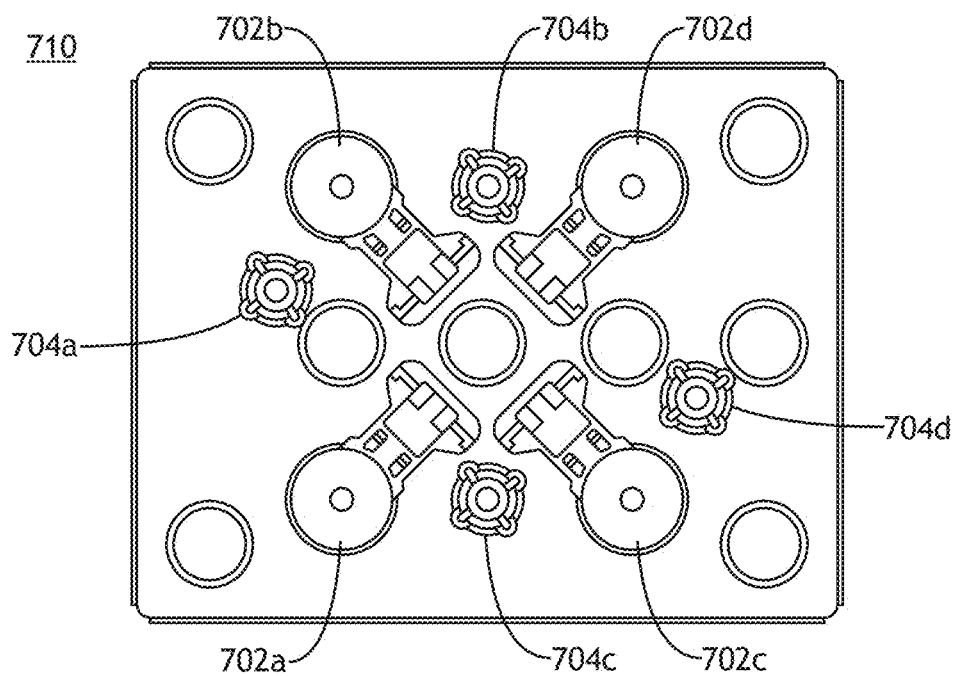
FIG. 7C illustrates a schematic view of an overlay including a set of sensor sub-systems and attachment sub-systems of the patient weighing system, in accordance with one or more embodiments of the present disclosure.
Figure 7D:
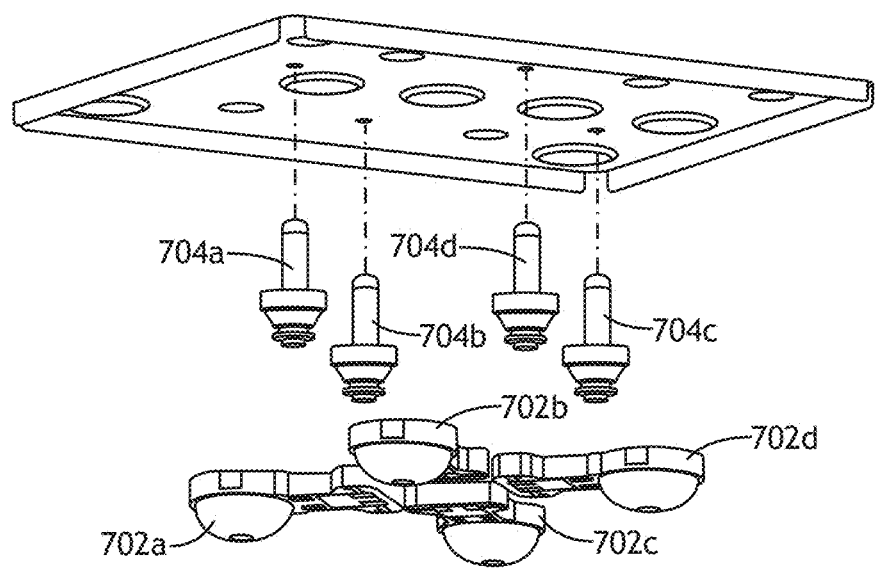
FIG. 7D illustrates a schematic view of an overlay including a set of sensor sub-systems and attachment sub-systems of the patient weighing system, in accordance with one or more embodiments of the present disclosure.

By way of another example, as shown in FIGS. 7A-7D, the middle overlay 700 may include at least three sensor sub-systems 106 coupled to a bottom surface of the middle overlay. For instance, the middle overlay 700 may include a first middle overlay sensor sub-system 702a, a second middle overlay sensor sub-system 702b, a third middle overlay sensor sub-system 702c, and a fourth middle overlay sensor sub-system 702d. Referring to FIGS. 7A-7B, the middle overlay 700 may include a first middle overlay sensor 702a on a first corner of the overlay 700, a second middle overlay sensor sub-system 702b on a second corner of the overlay 700, a third middle overlay sensor sub-system 702c on a third corner of the overlay 700, and a fourth middle overlay sensor sub-system 702d on a fourth corner of the overlay 700. Referring to FIGS. 7C-7D, the middle overlay 710 may include the four middle overlay sensor sub-systems 702a-702b arranged in a middle portion of the overlay 700 in a plus-sign configuration. Each of the middle overlay sensor sub-systems 702a-702d may be communicatively coupled to each other, such that each load cell of the middle overlay sensor sub-systems 702a-702d may be communicatively coupled to each other.

Figure 8A:
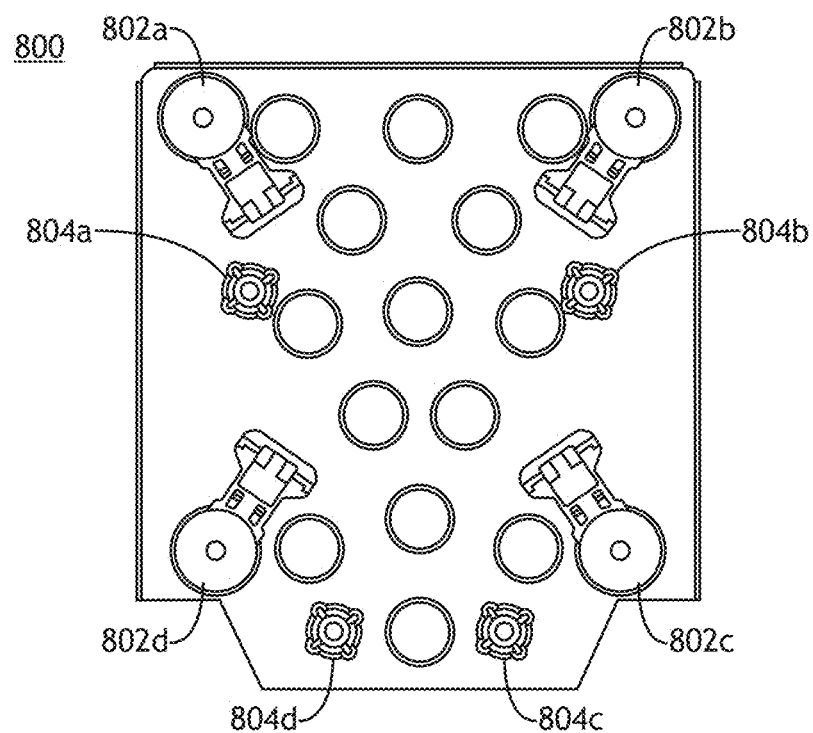
FIG. 8A illustrates a schematic view of an overlay including a set of sensor sub-systems and attachment sub-systems of the patient weighing system, in accordance with one or more embodiments of the present disclosure.
Figure 8B:
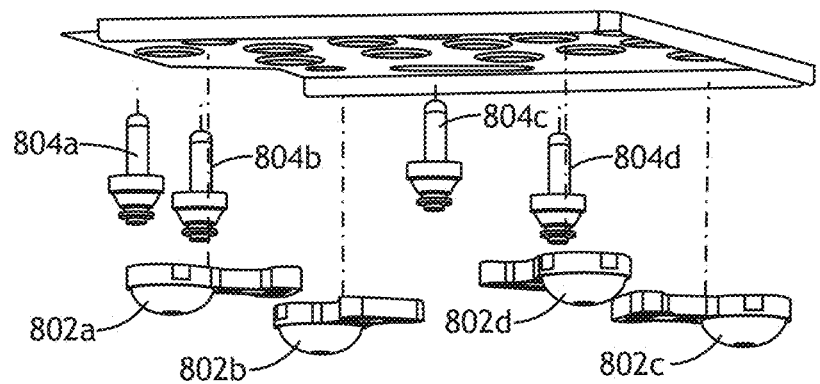
FIG. 8B illustrates a schematic view of an overlay including a set of sensor sub-systems and attachment sub-systems of the patient weighing system, in accordance with one or more embodiments of the present disclosure.
Figure 8C:
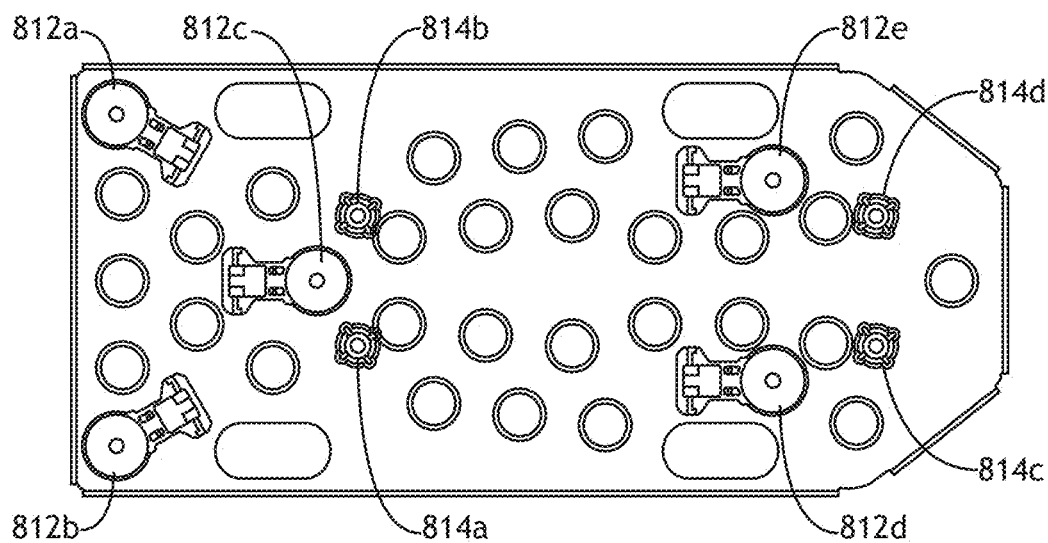
FIG. 8C illustrates a schematic view of an overlay including a set of sensor sub-systems and attachment sub-systems of the patient weighing system, in accordance with one or more embodiments of the present disclosure.
Figure 8D:
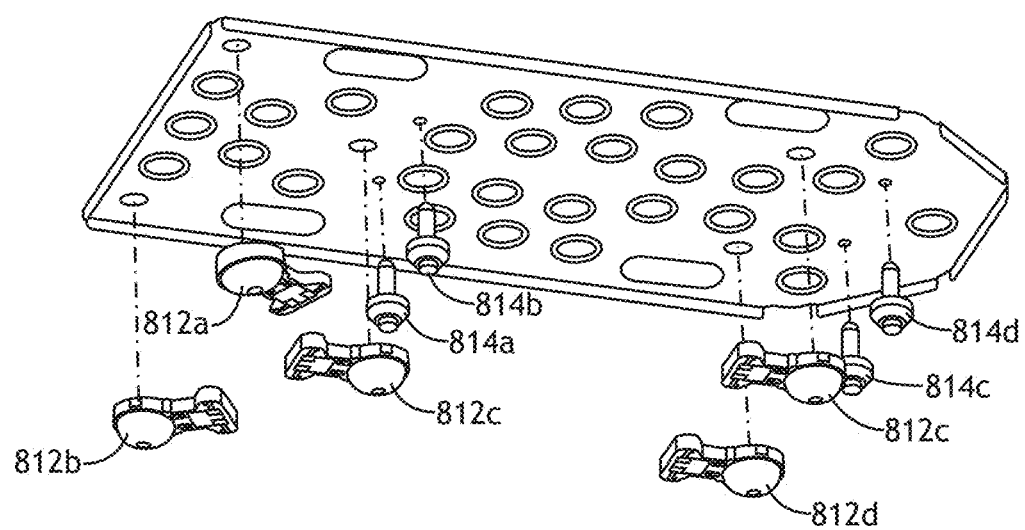
FIG. 8D illustrates a schematic view of an overlay including a set of sensor sub-systems and attachment sub-systems of the patient weighing system, in accordance with one or more embodiments of the present disclosure.

By way of another example, as shown in FIGS. 8A-8D, the bottom overlay 800, 810 may include at least three sensor sub-systems 106 coupled to a bottom surface of the bottom overlay. In one instance, as shown in FIGS. 8A-8B, the bottom overlay 800 may include a first bottom overlay sensor sub-system 802a, a second bottom overlay sensor sub-system 802b, a third bottom sensor sub-system 802c, and a fourth bottom overlay sensor sub-system 802d. In another instance, as shown in FIGS. 8C-8D, the bottom overlay 810 may include a first bottom overlay sensor sub-system 812a, a second bottom overlay sensor sub-system 812b, a third bottom sensor sub-system 812c, a fourth bottom overlay sensor sub-system 812d, and a fifth bottom sensor sub-system 812e. Each of the bottom overlay sensor sub-systems 802a-802d, 812a-812e may be communicatively coupled to each other, such that each load cell of the bottom overlay sensor sub-systems 802a-802d, 812a-812e may be communicatively coupled to each other.

Each set of sensor sub-systems 106 of each overlay 104 may be configured to operate independently to calculate a portion of a patient weight, such that a total patient may be calculated by summing together each calculated patient weight from each overlay/sensor sub-system. In this regard, each overlay 104 may operate as its own scale.

For example, as shown in FIG. 2A, the patient weighing system 100 may include a top overlay, a knee catch overlay, a middle overlay, and a bottom overlay. In this example, the top overlay sensor sub-system 502a-502e may be configured to calculate a first weight corresponding to a first portion of a patient's body. Continuing with this example, the knee catch overlay sensor sub-system 602a-602d may be configured to calculate a second weight corresponding to a second portion of a patient's body. Continuing with this example, the middle overlay sensor sub-system 702a-702d may be configured to calculate a third weight corresponding to a third portion of a patient's body. Continuing with this example, the bottom overlay sensor sub-system 802a-802d may be configured to calculate a fourth weight corresponding to a fourth portion of a patient's body. In this example, a total patient weight may be calculated by summing together the first weight from the top overlay, second weight from the knee catch overlay, third weight, from the middle overlay, and fourth weight from the bottom overlay.

By way of another example, as shown in FIG. 2B, the patient weighing system 100 may include a top overlay, a knee catch overlay, and a bottom overlay. In this example, the top overlay sensor sub-system 502a-502e may be configured to calculate a first weight corresponding to a first portion of a patient's body. Continuing with this example, the knee catch overlay sensor sub-system 602a-602d may be configured to calculate a second weight corresponding to a second portion of a patient's body. Continuing with this example, the bottom overlay sensor sub-system 812a-812d may be configured to calculate a third weight corresponding to a third portion of a patient's body. In this example, a total patient weight may be calculated by summing together the first weight from the top overlay, second weight from the knee catch overlay, and a third weight from the bottom overlay.

By way of another example, as shown in FIG. 2C, the patient weighing system 100 may include a top overlay, a middle overlay, and a bottom overlay. In this example, the top overlay sensor sub-system 502a-502e may be configured to calculate a first weight corresponding to a first portion of a patient's body. Continuing with this example, the middle overlay sensor sub-system 702a-702d may be configured to calculate a second weight corresponding to a second portion of a patient's body. Continuing with this example, the bottom overlay sensor sub-system 802a-802d may be configured to calculate a third weight corresponding to a third portion of a patient's body. In this example, a total patient weight may be calculated by summing together the first weight from the top overlay, second weight from the middle overlay, and third weight from the bottom overlay.

Although FIGS. 2A-2C and FIGS. 5A-8D illustrates a specific overlay and sensor sub-system configuration, it is noted herein that the patient weighing system 100 may include any configuration of overlays and sensor sub-systems. For example, it is contemplated herein the patient weighing system 100 may include any number and configuration of overlays 104 suitable for accommodating various patient sizes and needs. Further, in instances where it is not feasible to bring the full overlay assembly, it is contemplated herein that an individual overlay (or a few overlays) may be used to independently calculate respective portions of the patient weight and then summed together.

As previously noted herein, the patient weighing system 100 may be configured to calculate a patient weight when one or more of the overlays 104 are actuated to an upright/inclined position.

Figure 9A:
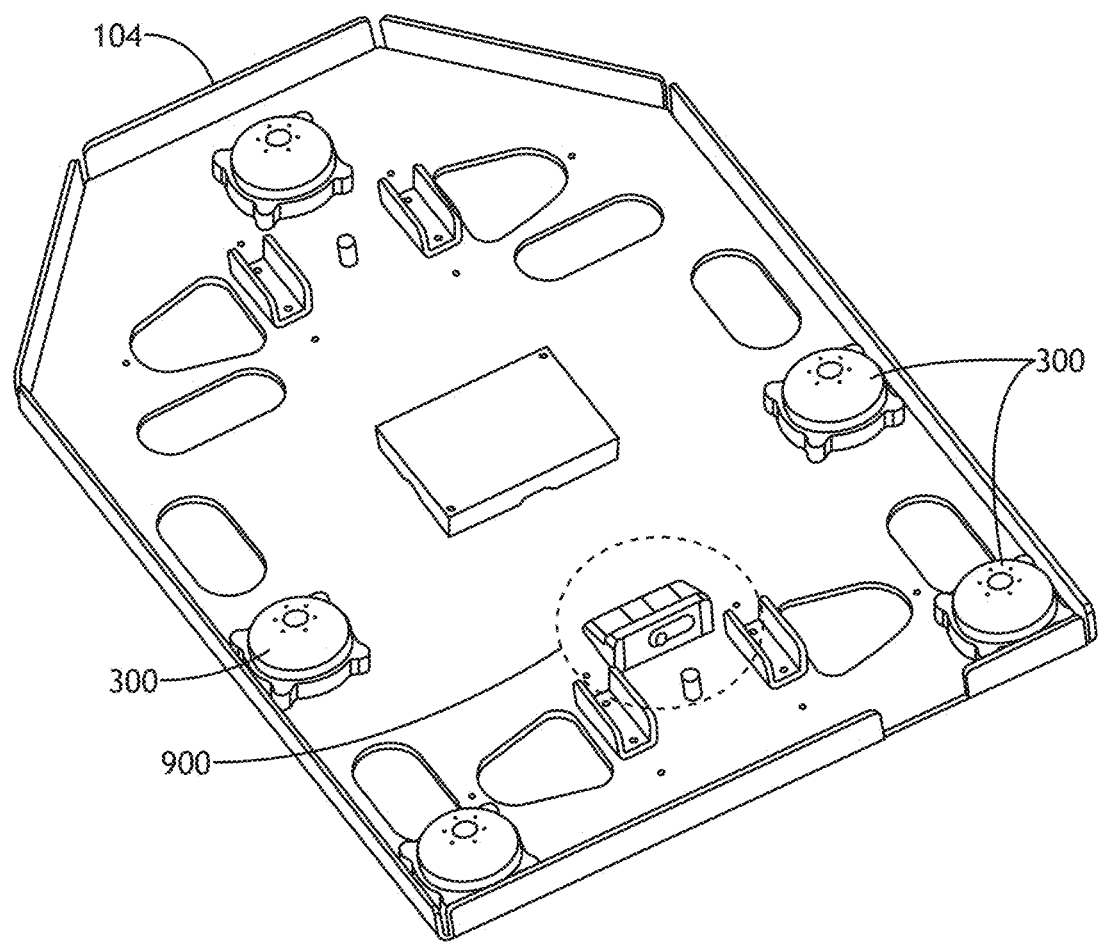
FIG. 9A illustrates a schematic view of a top overlay including a shear load cell, in accordance with one or more embodiments of the present disclosure.

Referring to FIGS. 9A-9D, the sensor sub-system 106 may include one or more shear load cells 900 configured to calculate a weight of a patient on an upright/inclined overlay (i.e., overlay inclined at some angle). For example, an overlay 104 may include one or more shear load cells 900 coupled to a surface of the overlay 104. For instance, as shown in FIG. 9A, a top overlay 104 may include one or more shear load cells 900. It is noted that the one or more shear load cells 900 may be arranged on any location on the overlay 104 (e.g., top overlay 104). For example, the one or more shear load cells 900 may be arranged in the middle of the top overlay and positioned horizontally. Although FIGS. 9A-9D depict the shear load cell 900 coupled to the top overlay, it is contemplated herein that the shear load cell 900 may be coupled to any of the overlays 104, such that the shear load cell 900 is able to calculate a patient weight for any overlay that is capable of being inclined at an angle.

Figure 9B:
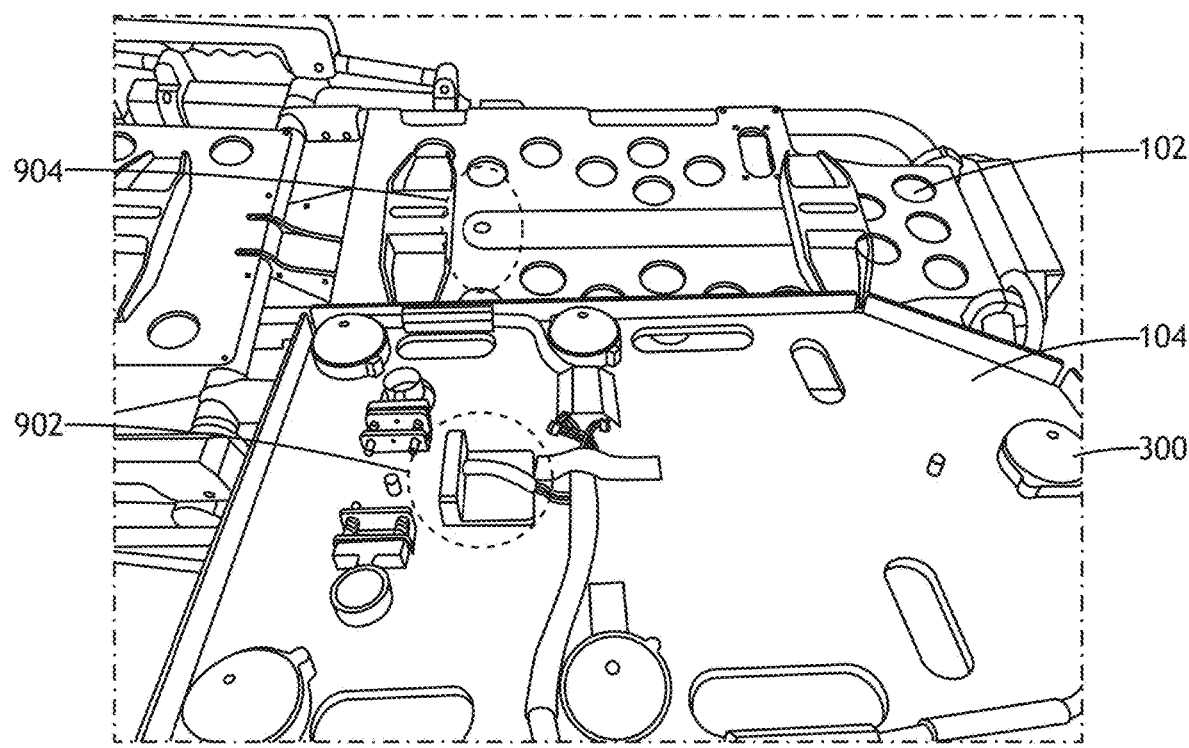
FIG. 9B illustrates a schematic view of the top overlay including the shear load cell, in accordance with one or more embodiments of the present disclosure
Figure 9C:
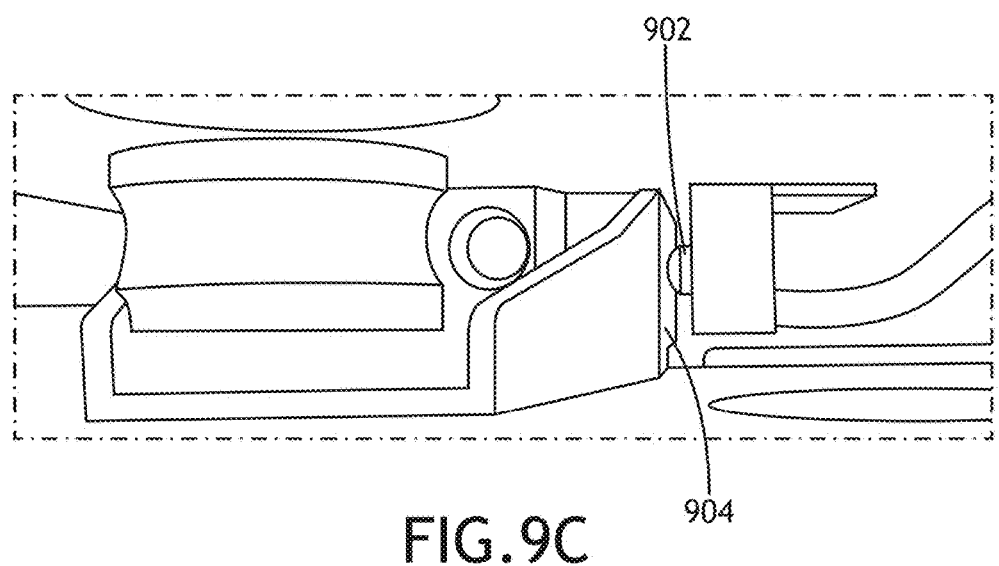
FIG. 9C illustrates a schematic view of the top overlay including the shear load cell, in accordance with one or more embodiments of the present disclosure.
Figure 9D:
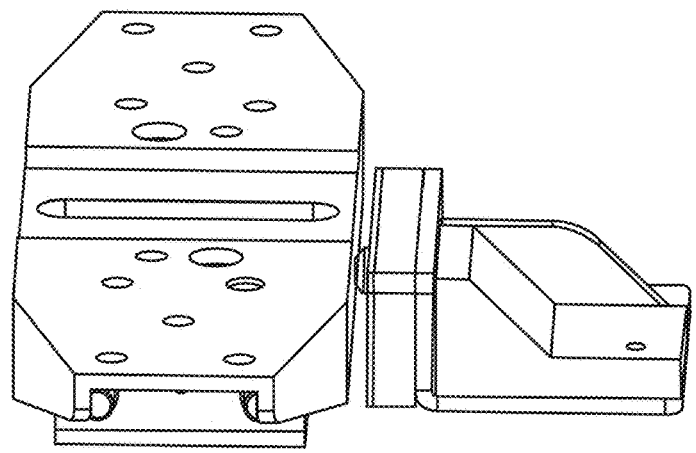
FIG. 9D illustrates schematic views of the shear load cell, in accordance with one or more embodiments of the present disclosure.
Figure 9D:
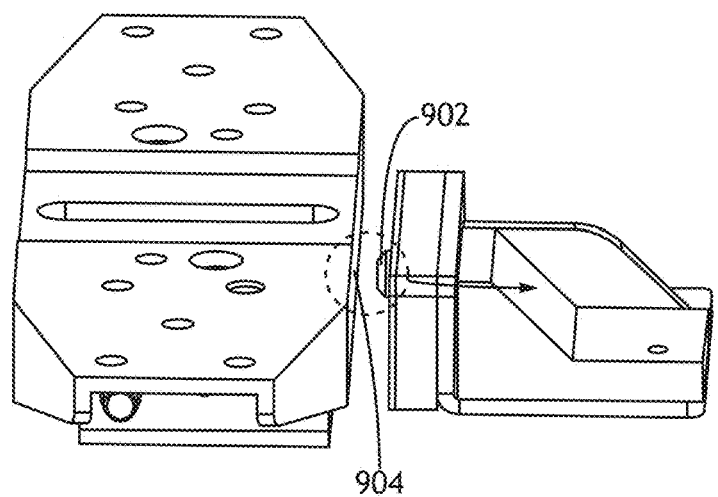
Figure 9D:
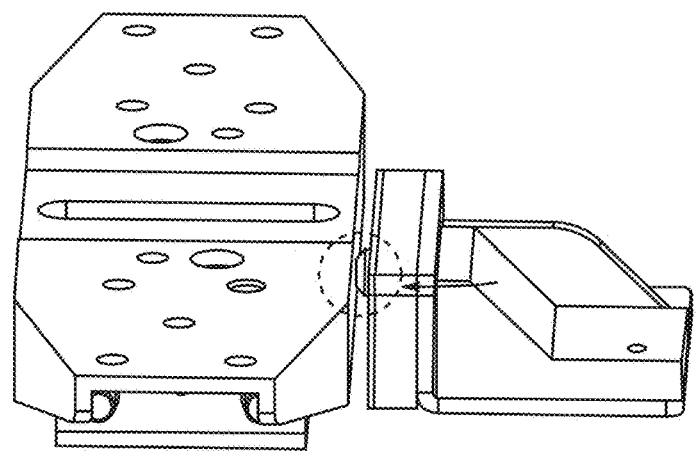

The one or more shear load cells 900 may be configured to measure a perpendicular force on the overlay 104 based on contact made between one or more rivets 902 of the one or more shear load cells 900 and one or more stoppers 904. For example, when installed on the top overlay, the one or more shear load cells 900 may be configured to measure a perpendicular force on the top overlay 104 based on contact made between one or more rivets 902 of the one or more shear load cells 900 and one or more stoppers 904, as shown in FIGS. 9C-9D.

The one or more shear load cells 900 may be configured to calculate a weight of a patient. For example, the weight may be calculated based on the data points from the one or more load cells 300 and the one or more shear load cells 900, as shown and described by Equation 1 below:

$$\text{Weight}(W) = \sqrt{\Sigma\text{Normal} + \Sigma\text{Shear}} \quad (1)$$

where $\Sigma$Normal is the sum from the flat overlays measured by the respective load cells 300 and $\Sigma$Shear is the sum from the inclined overlays measured by the respective shear load cells 900.

It is noted an accurate calculation of the weight of the patent in any position on the top panel may be determined based on data points. For example, a weight of the patient in the Fowler position, as shown in FIG. 9B, may be calculated using the one or more shear load cells 900 and the one or more load cells 300.

As previously discussed herein, the set of sensor systems may be daisy chained together. For example, the one or more shear load cells 900 may be daisy chained to one of the one or more load cells 300 via one or more wires (or other connection mechanism).

The patient weighing system 100 may further include a set of attachment sub-systems 108 configured to couple the patient weighing system 100 to a patient transport device 102 via the one or more cut outs 207, 209. Referring generally to FIGS. 5A-8D, the overlays 500-810 may include any configuration of attachment sub-systems 504a-814d.

Figure 5B:
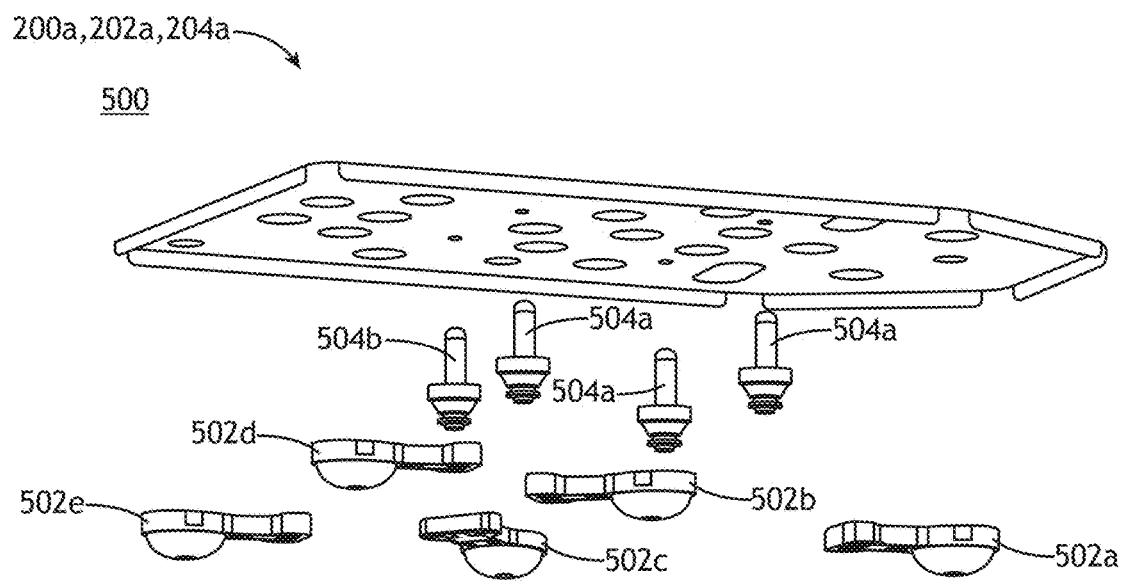
FIG. 5B illustrates a schematic view of an overlay including a set of sensor sub-systems and attachment sub-systems of the patient weighing system, in accordance with one or more embodiments of the present disclosure.

For example, as shown in FIGS. 5A-5B, the top overlay 500 may include at least four attachment sub-systems 108 configured to couple the top overlay to a top portion of the patient transport device 102 (e.g., a top frame portion 201a, 203a, 205a of the patient transport device). For instance, the top overlay 500 may include a first top overlay attachment sub-system 504a, a second top overlay attachment sub-system 504b, a third top overlay attachment sub-system 504c, and a fourth top overlay attachment sub-system 504d.

By way of another example, as shown in FIGS. 6A-6B, the knee catch overlay 600 may include at least four attachment sub-systems 108 configured to couple the knee catch overlay to a knee catch portion of the patient transport device 102 (e.g., a knee catch frame portion 201b, 203b of the patient transport device). For instance, the knee catch overlay 600 may include a first knee catch overlay attachment sub-system 604a and a second knee catch overlay attachment sub-system 604b.

By way of another example, as shown in FIGS. 7A-7D, the middle overlay 700 may include at least four attachment sub-systems 108 configured to couple the middle overlay to a middle portion of the patient transport device 102 (e.g., a middle frame portion 201c, 205b of the patient transport device 102). For instance, the middle overlay 700 may include a first middle overlay attachment sub-system 704a, a second middle overlay attachment sub-system 704b, a third middle overlay attachment sub-system 704c, and a fourth middle overlay attachment sub-system 704d.

By way of another example, as shown in FIGS. 8A-8D, the bottom overlay 800, 810 may include at least four attachment sub-systems 108 configured to couple the bottom overlay to a bottom portion of the patient transport device 102 (e.g., a bottom frame portion 201d, 203c, 205c of the patient transport device). For instance, as shown in FIGS. 8A-8B, the bottom overlay 800 may include a first bottom overlay attachment sub-system 804a, 814a, a second bottom overlay attachment sub-system 804b, 814b, a third bottom attachment sub-system 804c, 814c, and a fourth bottom overlay attachment sub-system 804d, 814d.

Figure 4:
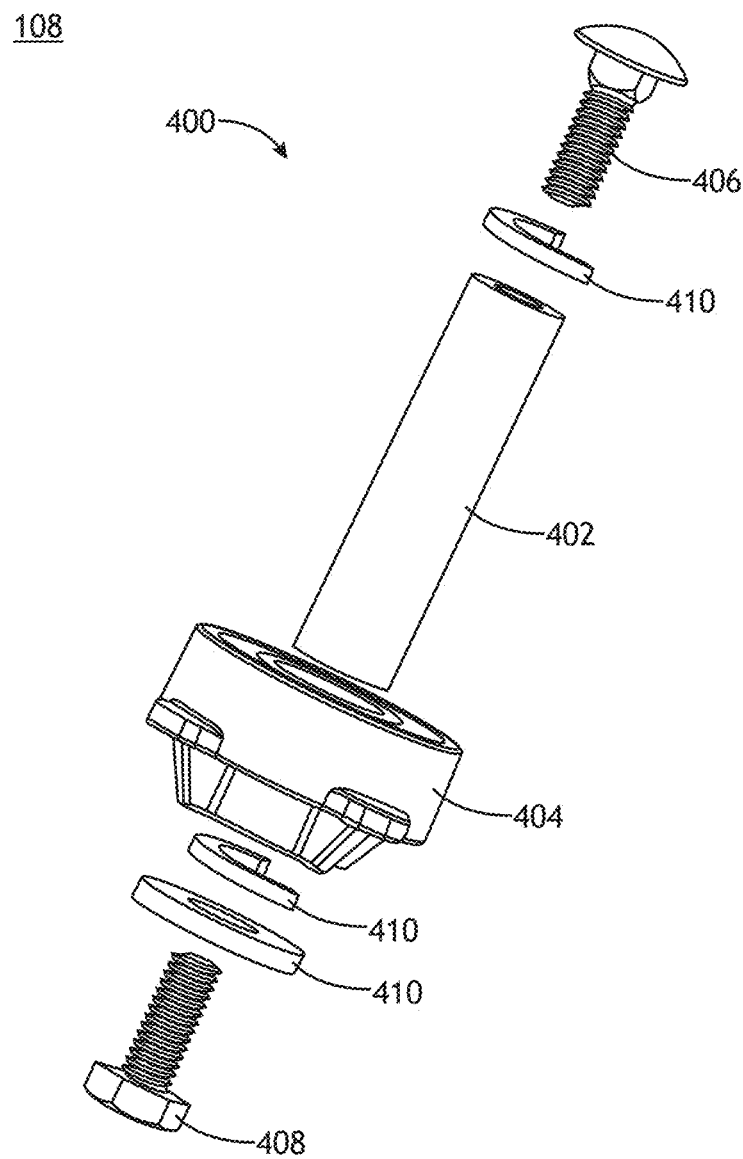
FIG. 4 illustrates an exploded view of an attachment sub-system of the patient weighing system, in accordance with one or more embodiments of the present disclosure.

Referring to FIG. 4, each attachment system 108 of the set of attachment sub-systems 108 may include a hole guide assembly 400 configured to secure each overlay of the set of overlays 104 to the patient transport device 102 via one or more cut outs 207, 209. For example, each hole guide assembly 400 may include a guide support 402, a guide 404, and one or more fasteners. For instance, the guide 404 may be configured to hold the overlay in place and the guide support 402 may be configured to lock the guide 404 into place while allowing for one degree of freedom on the z-axis. In this regard, the guide 404 may be configured to penetrate through the one or more cut outs 207 of the overlay and the one or more cut outs 209 on the frame of the patient transport device 102, while the guide support 402 may lock the guide into place.

The guide support 402 may include a female dual threaded rod. For example, the guide support 402 (e.g., the female duel threaded rod) may act as a pole and may be configured to inserted into the guide 404.

The one or more fasteners may include, but are not limited to, a square neck carriage bolt 406, a common hex head fastener 408, one or more washers 410, and the like. For example, the square neck carriage bolt 406 may be configured connect to each overlay 104 and be the point of contact that keeps each overlay 104 in place while allowing only for one degree of freedom. By way of another example, the common hex head fastener 408 may be configured to couple underneath the guide support 402 and hold it in place. By way of another example, the one or more washers 410 may be used as spacers, allowing the bolt 406 and fastener 408 to be thoroughly locked in place. It is noted herein that the one or more fasteners are not limited to the examples above, but may include any fastener known in the art including, but not limited to, one or more threaded screws, one or more non-threaded screws, one or more bolts, or the like.

Figure 10A:
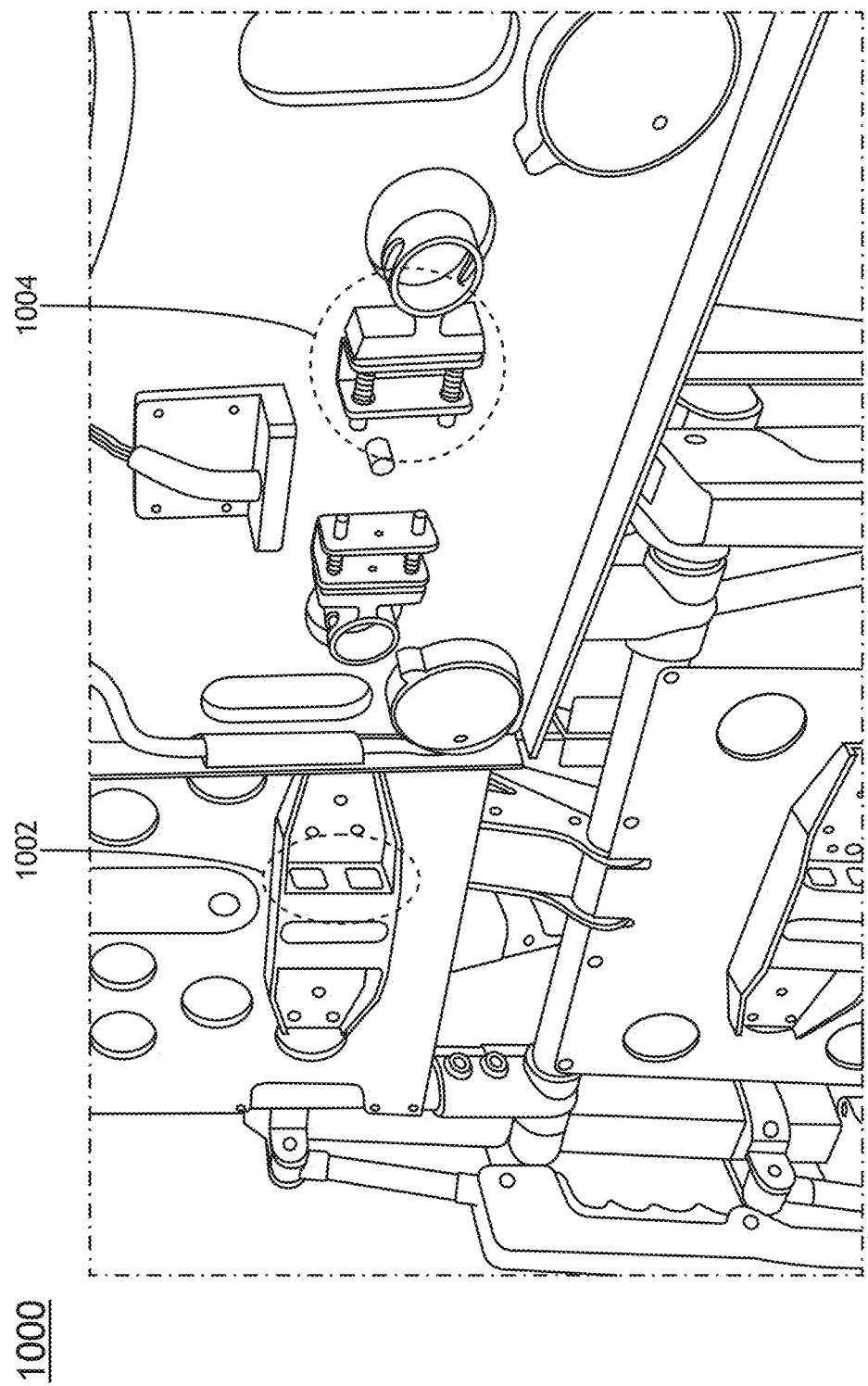
FIG. 10A illustrates a schematic view of a quick attach hole guide assembly of the patient weighing system, in accordance with one or more embodiments of the present disclosure.
Figure 10B:
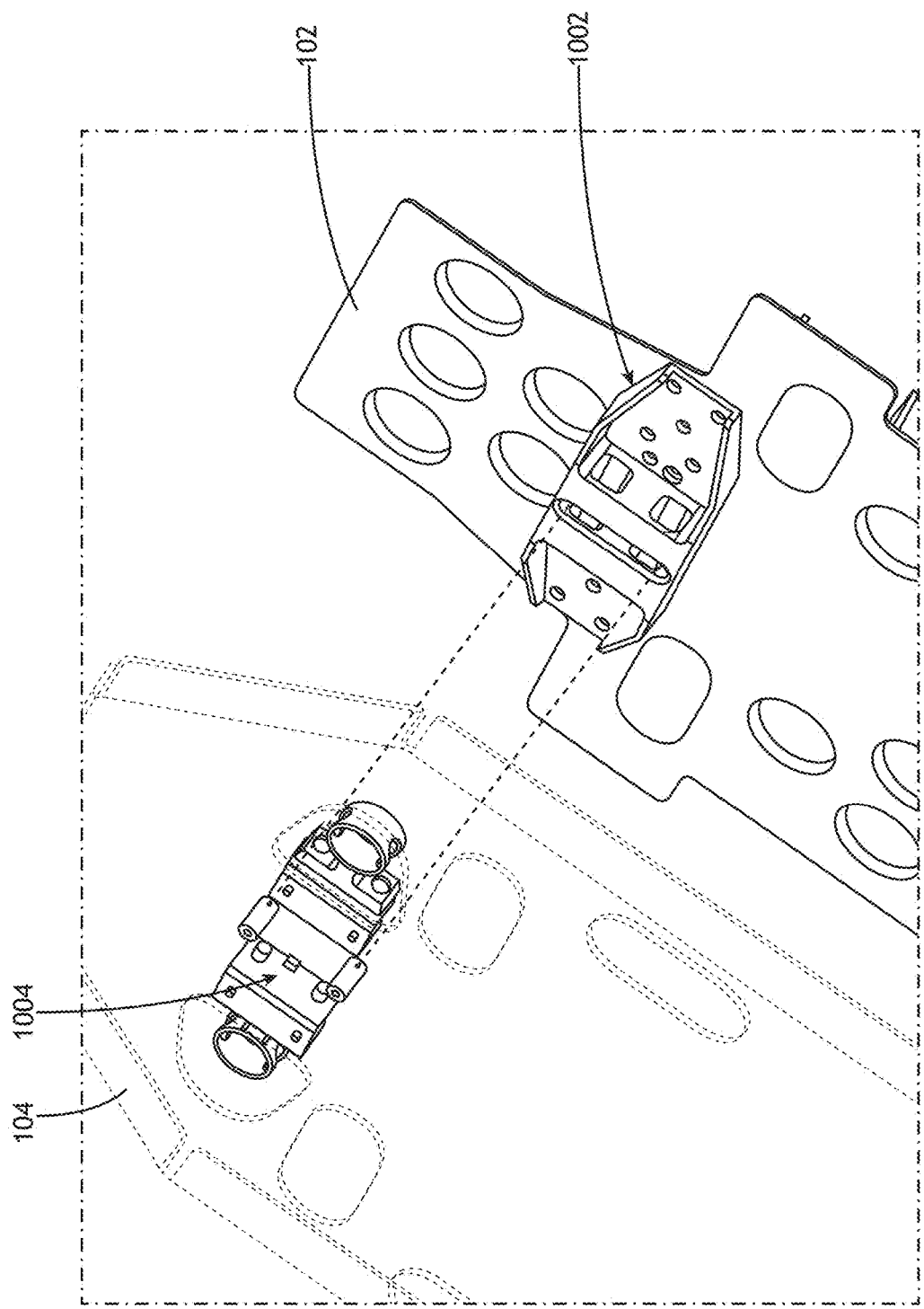
FIG. 10B illustrates a schematic view of the quick attach hole guide assembly of the patient weighing system, in accordance with one or more embodiments of the present disclosure.
Figure 10C:
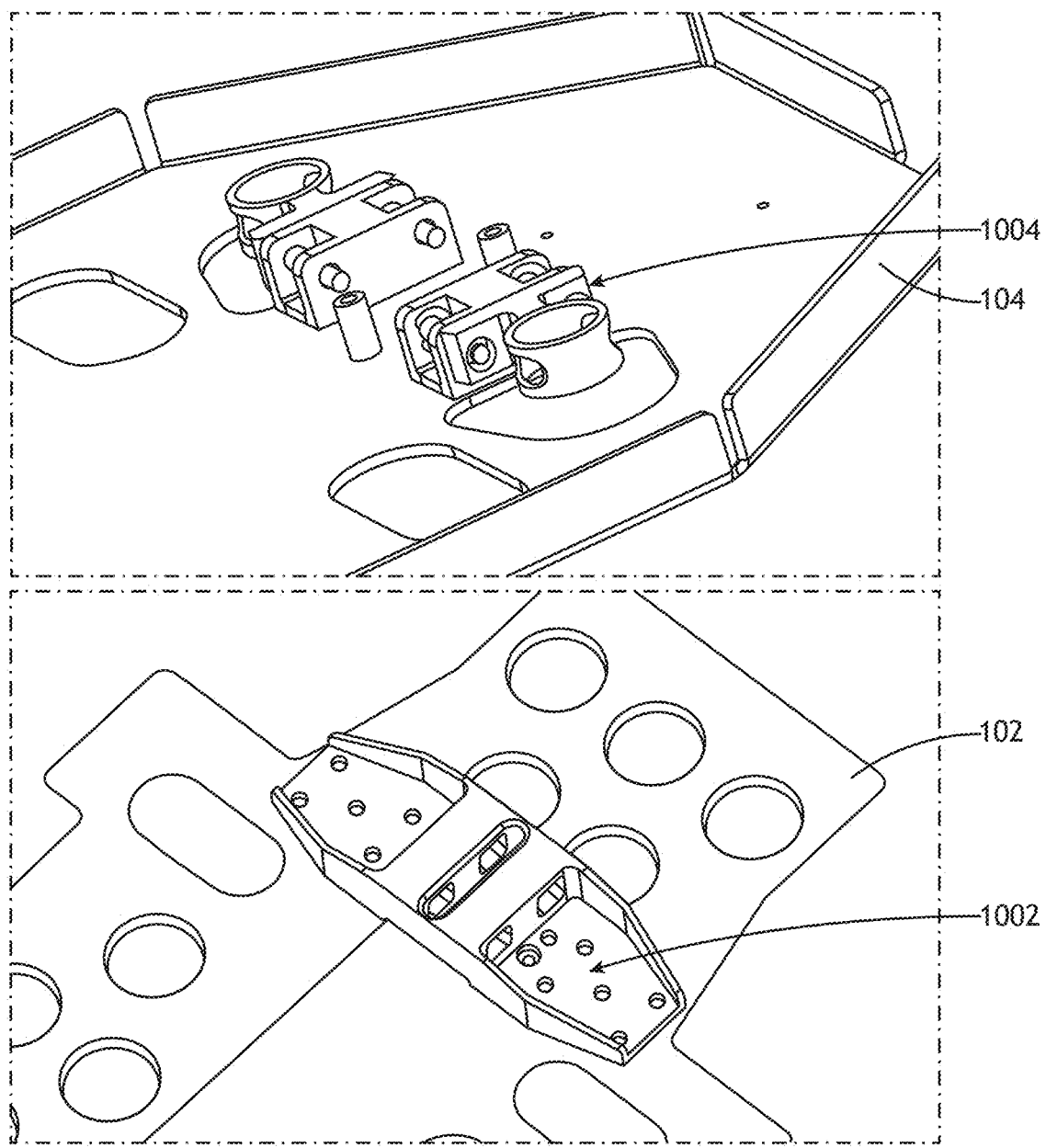
FIG. 10C illustrates a schematic view of the quick attach hole guide assembly of the patient weighing system, in accordance with one or more embodiments of the present disclosure.

Referring to FIGS. 10A-10C, each attachment system 108 of the set of attachment systems 108 may include a quick attach hole guide assembly 1000 configured to secure each overlay of the set of overlays 104 to the patient transport device 102. For example, each quick attach hole guide assembly 1000 may include a spring-loaded locking pin sub-assembly 1002 and a locking port and guide sub-assembly 1004. For instance, the spring-loaded locking pin sub-assembly 1002 may be configured to couple to a surface of the patient transport device 102 and the locking port and guide sub-assembly 1004 may be configured to coupled to a surface of the overlay 104. In this regard, the spring-loaded locking pin sub-assembly 1002 may be configured to reversibly mate with the locking port and guide sub-assembly 1004, such that the overlay 104 is removably coupled to patient transport device 102.

The spring-loaded locking pin sub-assembly 1002 may include, but is not limited to, one or more spring-loaded locking pins, one or more springs, one or more housings, one or more fasteners, and the like. As shown in FIGS. 10B-10C, the spring-loaded locking pin sub-assembly 1002 may be coupled to a top overlay via one or more fasteners (e.g., rivets).

The locking port and guide sub-assembly 1004 may include, but is not limited to, one or more sidewalls the define a cavity/locking port, one or more fasteners, and the like. As shown in FIGS. 10B-10C, the locking port and guide sub-assembly 1004 may be coupled to a top face of the patient transport device 102 via one or more fasteners (e.g., rivets).

Although FIGS. 10A-10C depict the quick attach hole guide assembly 1000 coupled to a specific overlay and in a specific configuration, it is noted herein that the quick attach hole guide assembly 1000 may be used with any overlay of the set of overlays 104 and may be attached to any location of the overlay 104 and patient transport device 102. Further, the attachment system 108 may include any number of quick attach hole guide assemblies 1000 suitable for coupling the overlay 104 to the patient transport device 102.

Figure 11A:
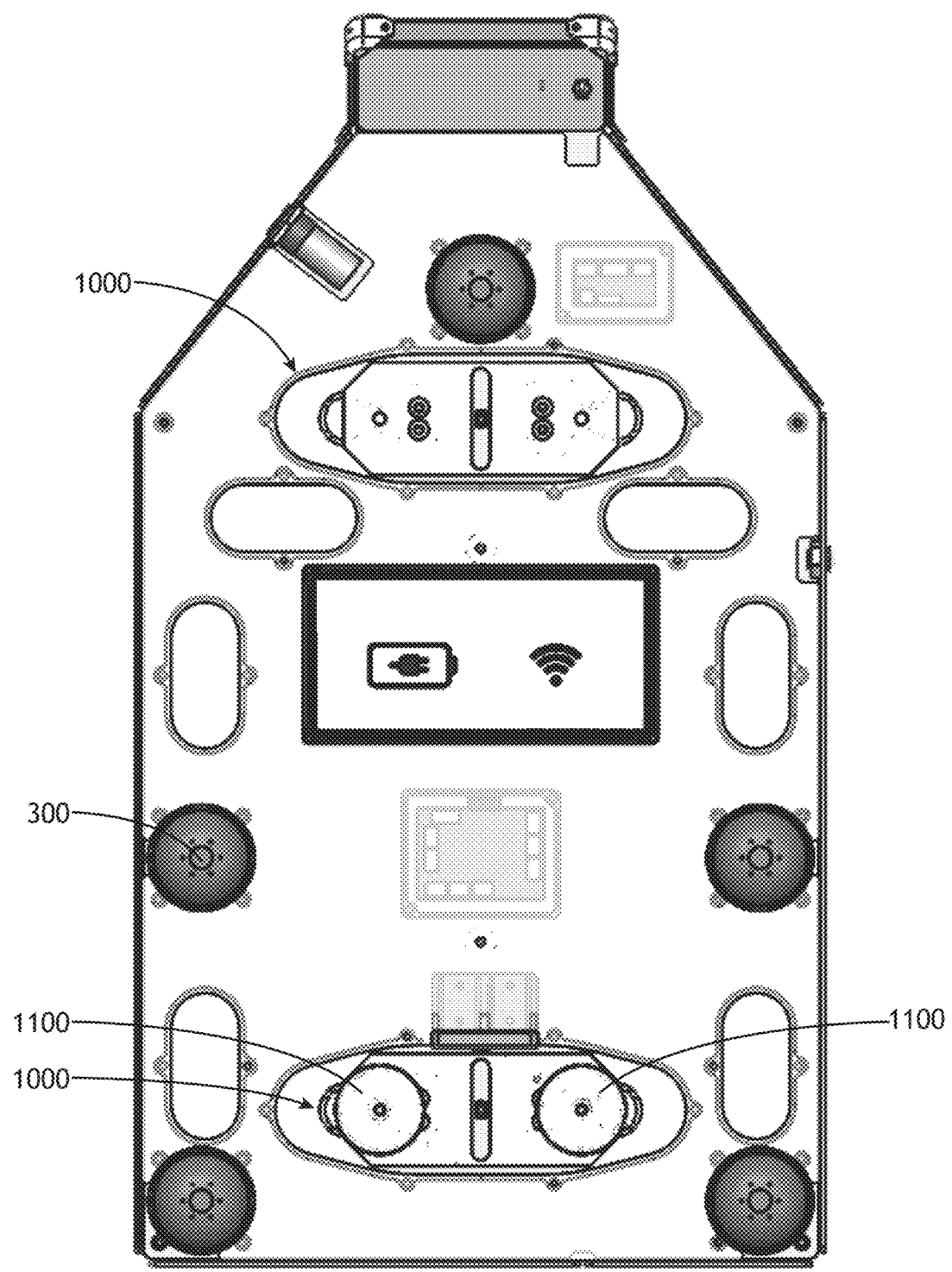
FIG. 11A illustrates a schematic view of the quick attach hole guide assembly of the patient weighing system, in accordance with one or more embodiments of the present disclosure.
Figure 11B:
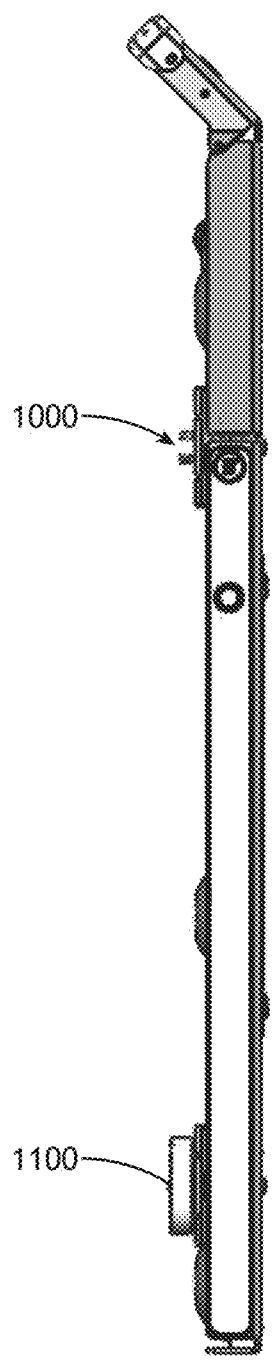
FIG. 11B illustrates a schematic view of the quick attach hole guide assembly of the patient weighing system, in accordance with one or more embodiments of the present disclosure.
Figure 11C:
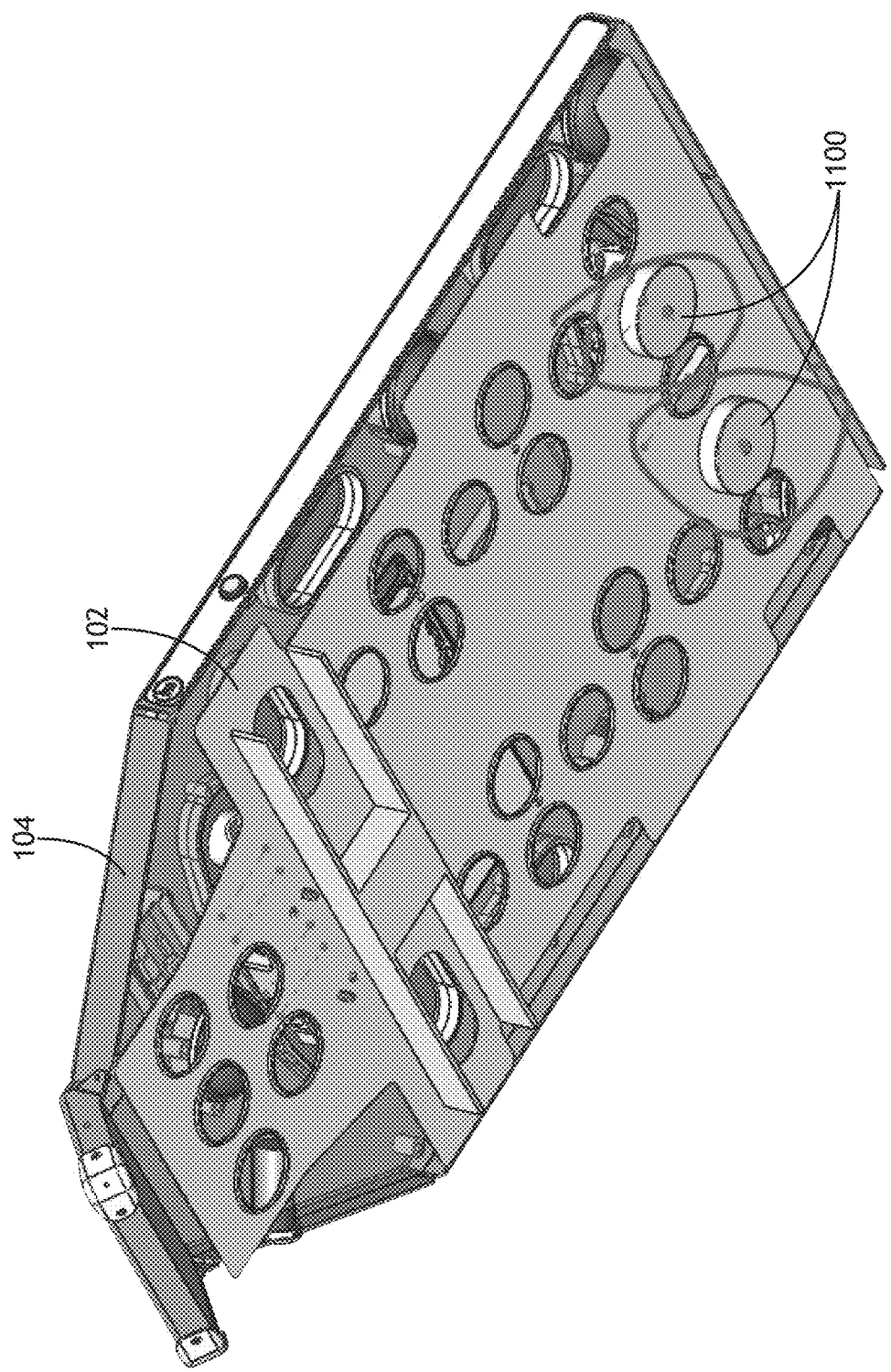
FIG. 11C illustrates a schematic view of the quick attach hole guide assembly of the patient weighing system, in accordance with one or more embodiments of the present disclosure.

Referring to FIGS. 11A-11C, in some embodiments, the quick attach hole guide assembly 1000 further includes one or more puck locking members 1100. For example, the one or more puck locking members 1100 may be used to couple the patient transport device 102 to a respective overlay 104. Although FIGS. 11A-11C depict the one or more puck locking members 1100 coupled to a specific overlay and in a specific configuration, it is noted herein that the one or more puck locking members 1100 may be used with any overlay of the set of overlays 104 and may be attached to any location of the overlay 104 and patient transport device 102.

Referring again to FIG. 1A, the patient weighing system 100 may further include one or more controllers 110. The one or more controllers 110 including one or more processors 112 and memory 114. The one or more processors 112 may be configured to execute a set of program instructions stored in memory 114, the set of program instructions configured to cause the one or more processors 112 to carry out one or more steps of the present disclosure.

The one or more controllers 110 may be coupled to a communication interface. 116. The communication interface 116 may include any communication interface known in the art. For example, the communication interface may include, but is not limited to, Zigbee, Raspberry Pi, a wired universal asynchronous receiver-transmitter (UART), or the like.

In some embodiments, the system 100 may further include a sensor interface 118. For example, the system 100 may include a sensor interface operated through the communication interface 116. The sensor interface 118 may be coupled to the set of sensor sub-systems 106.

The system 100 may further include a power source 120. The power source 120 may include any power source known in the art including, but not limited to, a rechargeable battery pack, or the like.

The one or more controllers, the power source, and the communication interface may be housed in a housing. For example, the housing may be formed of a protective material to protect one or more components of the controller from external damage.

The patient weighing system 100 may further include one or more user interface devices 122. The one or more user interface devices 122 may include any user interface known in the art including, but not limited to, a tablet, smartphone, phablet, or the like. The user interface device 122 may include one or more user input devices 124 configured to receive one or more input commands from a user. The user interface device 122 may include a display 126 configured to display data of the patient weighing system 100 to the user. For example, the display may include, but is not limited to, a liquid crystal display (LCD), an organic light-emitting diode (OLED) based display, or a CRT display.

The user interface device 122 may be configured to display one or more graphic user interfaces (GUIs). For example, the controller 110 may be configured to generate one or more control signals based on sensor data received from the set of sensor sub-systems 106 to cause the display 126 of the one or more user interface devices 122 to display one or more GUIs. In a non-limiting example, the one or more GUIs may include data from the patient weighing system 100 such as, but not limited to, total patient weight, individual weight from the individual overlays, or the like.

In some embodiments, the controller 110 may be configured to generate one or more control signals configured to cause the user interface device 122 is display an alert. For example, in a non-limiting example, the alert may include a patient lifting regulation warning based on a predetermined maximum lifting weight and the determined patient weight. In this regard, the patient weighing system 100 is able to monitor and ensure compliance with regulations regarding the lifting of patients, thereby promoting the health and safety of EMS personnel by reducing the risk of lifting-related injuries. By way of another example, in a non-limiting example, the alert may include a maintenance warning based on a predictive maintenance schedule (either manually or automatically entered into the system 100) of the patient transport device 102 and the sensor data from the set of sensor sub-systems 106 (e.g., duration of use, or like). In this regard, the patient weighing system 100 is able to aid in extending equipment life and ensure reliability and safety.

The one or more user input devices 124 of the user interface device 122 may be configured to receive one or more user inputs. For example, in a non-limiting example, the one or more user inputs may include patient information such as, but not limited to, patient age (or birthdate), patient height, patient name, patient's medication listing (e.g., to perform an automated drug interaction check to prevent adverse drug interactions), or the like.

The communication interface 116 may be communicatively coupled to the one or more user interface devices 122. For example, the communication interface 116 may be coupled such that the one or more user interface devices 122 may be configured to operate each set of sensor sub-systems 106 and perform weight-based calculations. In one instance, the communication interface 116 may be coupled via a wired connection to the user interface device 122 to operate scale. In another instance, the communication interface 116 may be coupled via a wireless connection (e.g., Bluetooth connection, WiFi connection, or the like) to the user interface device 122.

The controller 110 may be configured to receive sensor data from the set of sensor sub-systems 106 via the communication interface 116. The sensor data from the set of sensor sub-systems 106 may include data related to the weight-based calculations. In some embodiments, the sensor data may be time-stamped. For example, sensor data from the set of sensor sub-system 106 (e.g., load cell weight data, shear load cell weight data, additional sensor data, or the like) may be time-stamped to indicate when such data was measured. In this regard, the patient weighing system 100 may be configured to determine a duration of time that the patient remains on the patient transport device 102, such that transfer times may be monitored in accordance with health regulations and patient care standards. Further, it is contemplated herein that the time-stamped data may be used to audit the duration of EMS response to verify service efficiency, support funding applications, and facilitate improvements in emergency response times. Additionally, it is contemplated herein that the time-stamped data may be used to determine precise measurement of fluid dynamics in patients. For example, a weight of a patient before an infusion of fluid or loss of blood may be compared to a weight after such infusion or loss of blood. In this regard, the patient weighing system 100 may be configured to accurately assess and treat burn victims and other conditions requiring detailed fluid management.

Although embodiments of the present disclosure are directed to using the sensor data from the load cells 300 to determine a patient weight, it is contemplated herein that the sensor data from the one or more load cells 300 may be used to monitor a patient's movement while on the patient transport device 102. For example, the one or more load cells 300 may measure a force upon the respective overlay 104. In this regard, if the values of the load cells are increasing by substantially large increments (e.g., 5+ lbs, 10+ lbs, or the like), the patient weighing system 100 may determine that the patient is thrashing (and possibly being physically restrained). Additionally, the sensor data from the load cells 300 may be used to monitoring CPR. For example, the one or more load cells 300 may measure a force upon the respective overlay that may be used to determine that cadence of the CPR and in some instances, provide recommended adjustments.

Further, it is contemplated herein that the location (e.g., coordinates) of each load cell 300 may be known, such that the patient weighing system 100 may analyze where the weight is distributed in order to output the most accurate weight possible when the patient is fully on the patient weighing system 100. In this regard, the patient weighing system 100 may know when the patient is not centered on the patient transport device 102 increasing the possibility of the patient transport device 102 tipping over.

Referring to FIG. 1B, the user interface device 122 may be configured to mechanically couple (e.g., Velcro, magnet, fastener, or the like) to an exterior surface of the patient transport device 102. The user interface device 122 may be configured to attach or detach from the exterior surface of the patient transport device 102 to provide information to the EMS while away from the patient transport device 102. Further, it is contemplated herein that the user interface device 122 may be a remote device configured to communicatively couple to the communication interface (or other components of the system 100) via a wireless connection.

It is noted herein that the one or more components of the disclosed system may be communicatively coupled to the various other components of the system in any manner known in the art. For example, the one or more components may be communicatively coupled to each other and other components via a wireline (e.g., copper wire, fiber optic cable, USB, and the like) or wireless connection (e.g., RF coupling, IR coupling, data network communication (e.g., Wi-Fi, WiMAX, Bluetooth and the like).

Applicant notes herein that the system may have a number of benefits. For example, the system may be configured to help decrease liability and improve patient care by reducing prehospital dosing error, improve stroke patient response time and provide necessary information to EMS air services. The system may be configured to reduce pediatric dose errors, improve stroke patient care, and improve air EMS services. This is accomplished by obtaining an accurate weight of the patient, differentiating between adults and pediatric patients when using weight-based criteria, eliminating the need for medical professionals to do drug calculations and providing proper administration techniques.

It is contemplated herein that the patient weighing system 100 may be packaged in a smaller package such that it is portable and thus, can be easily brought to the patient to obtain weight.

Further it is contemplated herein that the patient weighing system 100 may incorporates a scanning tool configured to estimate patient weight using advanced machine learning algorithms. In this regard, the accuracy of medication dosing may be improved by providing precise weight estimations in critical care situations.

Additionally, it is contemplated herein that the patient weighing system 100 may include advanced protocol filtering which acts as the groundwork for the development of an AI-driven artificial paramedic system. In this regard, the selection of medical protocols based on situational analysis may be optimized, while also enhancing the efficiency and accuracy of emergency medical interventions. For example, the patient weighing system 100 may incorporate previous patient history in the analytics of filtering the protocols and what treatments are recommended. In this regard, protocol filtering may be expanded and recommendations may be generated based on all protocols. As such, the patient weighing system 100 may incorporate data from sensors, patient history, dispatch data, and in some instances, visual data to assess and extract.

It is contemplated that the patient weighing system 100 may integrate with dispatch software. For example, the patient weighing system 100 may collect data and provide such data determine what type of scene first responders are coming up upon. This could include the information the dispatch types and sends to the medics and the phone conversation itself.

Further, it is contemplated herein that the patient weighing system 100 may providing AI-assisted diagnostic and procedural guidance to EMTs. In this regard, the patient weighing system 100 is able to elevate EMTs' ability to deliver paramedic-level care by advising on the "what" of medical intervention, allowing EMTs to focus on the "how."

Additionally, it is contemplated herein that the patient weighing system 100 may be configured to enable accurate tracking of medication and equipment usage, thereby streamlining inventory management. This ensures that emergency services are always prepared with the necessary supplies, reducing the risk of critical shortages.

It is contemplated herein that the patient weighing system 100 may centralize patient data collection by integrating with various monitoring devices. For example, this centralization may support the AI's decision-making processes by providing a comprehensive overview of the patient's condition.

Further, it is contemplated herein that the patient weighing system 100 may integrated with Electronic Patient Care Record (ePCR) systems. In this regard, the patient weighing system 100 is able to ensure seamless documentation and information flow within the emergency medical services ecosystem, supporting clinical decision-making and administrative processes.

Additionally, it is contemplated herein that the patient weighing system 100 may be configured to analyze all inputted data to inform the hospital with time-saving information. For example, this may be related to the AI-Protocol filtering. For instance, the system 100 may be configured to output likelihoods of what the patient is experiencing based on the inputs from the scale sensors, dispatch data, other integrated sensors, and input data.

It is contemplated herein that the patient weighing system 100 may be configured to analyze the one or more sensors of the sub-system 106 to analyze when the patient calculated weight is the most precise possible. As mentioned previously, the sensors may include, but are not limited to, Pressure, Accelerometer, Inclinometers, Barometric, GPS sensors, or the like.

Further, it is contemplated herein that the patient weighing system 100 may be configured to analyze the decisions and recommendations provided by the system 100 based on patient outcome. For example, the system 100 may be configured to analyze and continue training based on medic's being able to look through previous calls and recommend personalized training.

Additionally, it is contemplated herein that the patient weighing system 100 may be integrated with one or more wearable health devices to offer real-time updates on patient vitals and health status for more informed decision-making.

It is contemplated herein that the patient weighing system 100 may be configured to include machine learning algorithms configured to analyze patient data and predict potential complications, aiding in preventative measures and tailored care strategies.

Further, it is contemplated herein that the patient weighing system 100 may be configured to facilitate remote monitoring capabilities for continuous care, allowing healthcare professionals to monitor patient progress post-discharge or during transport to the hospital.

Additionally, it is contemplated herein that the patient weighing system 100 may be configured to include blockchain technology to securely store and share patient data to ensure data integrity and confidentiality.

It is contemplated herein that the patient weighing system 100 may incorporate augmented reality (AR) functionality to provide EMTs with visual aids and step-by-step procedures during emergency care, improving the accuracy and efficiency of medical interventions.

Further, it is contemplated herein that the patient weighing system 100 may implement voice recognition for hands-free operation, allowing EMTs to access information and log actions without interrupting patient care.

Additionally, it is contemplated herein that the patient weighing system 100 be configured to use AI to develop tailored care plans based on individual patient histories and present conditions, improving outcomes through customized treatment strategies.

It is further contemplated herein that the patient weighing system 100 may integrate portable diagnostic tools for immediate testing and results analysis, such as blood glucose levels or ECG readings, enabling swift decision-making.

Further, the patient weighing system 100 may integrate with real-time consultation systems to provide real-time consultations with specialists during emergencies, bridging the gap between EMTs and hospital care with expert advice.

Additionally, it is contemplated herein that the patient weighing system 100 may include predictive analytics to prioritize patient care needs in multi-casualty incidents, ensuring that critical resources are allocated efficiently.

it is further contemplated herein that the patient weighing system 100 may incorporate modules to provide patients with visual and interactive explanations of their condition and care, enhancing understanding and compliance.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. A patient weighing system, the patient weighing system comprising:
    a set of overlays configured to cover a top face of a patient transport device, at least one overlay of the set of overlays configured to actuate between a flat position and an inclined position;
    a set of attachment sub-systems, each attachment sub-system of the set of attachment sub-systems configured to couple each overlay of the set of overlays to the top face of the patient transport device;
    a set of sensor sub-systems, each overlay of the set of overlays including at least one set of sensor sub-systems arranged on a bottom face of each overlay of the set of overlays, each sensor sub-system of the set of sensor sub-systems including at least one load cell, the at least one load cell configured to electrically couple to at least one voltage amplification board, the set of sensor sub-systems further including at least one shear load cell coupled to the at least one overlay configured to actuate between the flat position and the inclined position, the at least one load cell communicatively coupled to the at least one shear load cell, the at least one shear load cell configured to measure a weight of a portion of a patient's body when the at least one overlay is in the inclined position, the at least one load cell configured to measure a weight of a portion of a patient's body on at least one additional overlay in a flat position;
    a user interface device including a display; and
    a controller communicatively coupled to each sensor sub-system of the set of sensor sub-systems and the user interface device, the controller including one or more processors configured to execute a set of program instructions stored in a memory, the set of program instructions configured to cause the one or more processors to:
        receive at least a first weight corresponding to a first portion of a patient's body from the at least one load cell of the at least one additional overlay in the flat position;
        receive at least an additional weight corresponding to an additional portion of a patient's body from the at least one shear load cell of the at least one overlay in the inclined position;
        calculate a total patient weight by summing the received first weight and received additional weight; and
        generate one or more control signals configured to cause the display of the user interface device to display the calculated total patient weight.

2. The patient weighing system of claim 1, wherein each sensor sub-system of the set of sensor sub-systems further comprises at least one dowel pin, the at least one dowel pin configured to compress the at least one load cell to cause the at least one load cell to generate an electrical voltage when force is applied along a z-axis.

3. The patient weighing system of claim 1, wherein the patient transport device includes at least one of a gurney or a stretcher.

4. The patient weighing system of claim 3, wherein a top face of the set of overlays is configured to receive a bottom portion of a cushion of the patient transport device.

5. The patient weighing system of claim 1, wherein the at least one shear load cell is coupled to at least one of:
    a top overlay, a knee catch overlay, a middle overlay, or a bottom overlay.

6. The patient weighing system of claim 1, wherein the set of attachment sub-systems comprise:
    a guide assembly.

7. The patient weighing system of claim 6, wherein the guide assembly includes a quick attach hole guide sub-assembly.

8. The patient weighing system of claim 7, wherein the quick attach hole guide sub-assembly comprises:
    a spring-loaded locking pin sub-assembly; and
    a locking port and guide sub-assembly, the spring-loaded locking pin sub-assembly configured to reversibly couple to the locking port and guide sub-assembly.

9. The patient weighing system of claim 1, wherein the set of sensor sub-systems further include one or more additional sensors.

10. The patient weighing system of claim 9, wherein the one or more additional sensors include at least one of:
    one or more location sensors, one or more accelerometers, one or more inclinometers, one or more barometric sensors, one or more environmental sensors, or one or more pressure sensors.

11. The patient weighing system of claim 1, wherein data from at least one of the at least one load cell or the at least one shear load cell is time-stamped.

12. A patient weighing system, the patient weighing system comprising:
    a set of overlays configured to cover a top face of a patient transport device, at least one overlay of the set of overlays configured to actuate between a flat position and an inclined position;
    a set of attachment sub-systems, each attachment sub-system of the set of attachment sub-systems configured to couple each overlay of the set of overlays to the top face of the patient transport device;
    a set of sensor sub-systems, each overlay of the set of overlays including at least one set of sensor sub-systems arranged on a bottom face of each overlay of the set of overlays, each sensor sub-system of the set of sensor sub-systems including at least one load cell, the at least one load cell configured to electrically couple to at least one voltage amplification board, the set of sensor sub-systems further including at least one shear load cell coupled to the at least one overlay configured to actuate between the flat position and the inclined position, the at least one load cell communicatively coupled to the at least one shear load cell, the at least one shear load cell configured to measure a weight of a portion of a patient's body when the at least one overlay is in the inclined position, the at least one load cell configured to measure a weight of a portion of a patient's body on at least one additional overlay in a flat position.

13. The patient weighing system of claim 12, wherein the at least shear load cell is coupled to at least one of:
a top overlay, a knee catch overlay, a middle overlay, or a bottom overlay.

14. The patient weighing system of claim 12, wherein the set of attachment sub-systems comprise:
a guide assembly.

15. The patient weighing system of claim 14, wherein the guide assembly includes a quick attach hole guide sub-assembly.

16. The patient weighing system of claim 15, wherein the quick attach hole guide sub-assembly comprises:
a spring-loaded locking pin sub-assembly; and
a locking port and guide sub-assembly, the spring-loaded locking pin sub-assembly configured to reversibly couple to the locking port and guide sub-assembly.

17. The patient weighing system of claim 12, wherein the set of sensor sub-systems further include one or more additional sensors.

18. The patient weighing system of claim 17, wherein the one or more additional sensors include at least one of:
one or more location sensors, one or more accelerometers, one or more inclinometers, one or more barometric sensors, one or more environmental sensors, or one or more pressure sensors.

19. The patient weighing system of claim 12, wherein data from at least one of the at least one load cell or the at least one shear load cell is time-stamped.

20. A patient weighing system, the patient weighing system comprising:
an overlay configured to cover a top face of a patient transport device, the overlay configured to actuate between a flat position and an inclined position;
a set of attachment sub-systems, each attachment sub-system of the set of attachment sub-systems configured to couple the overlay to the top face of the patient transport device;
a set of sensor sub-systems, the overlay including at least one set of sensor sub-systems arranged on a bottom face of the overlay, each sensor sub-system of the set of sensor sub-systems including at least one load cell, the at least one load cell configured to electrically couple to at least one voltage amplification board, the set of sensor sub-systems further including at least one shear load cell coupled to the overlay configured to actuate between the flat position and the inclined position, the at least one load cell communicatively coupled to the at least one shear load cell;
a user interface device including a display; and
a controller communicatively coupled to each sensor sub-system of the set of sensor sub-systems and the user interface device, the controller including one or more processors configured to execute a set of program instructions stored in a memory, the set of program instructions configured to cause the one or more processors to:
receive a patient weight of a patient's body from the at least one load cell and the at least one shear load cell; and
generate one or more control signals configured to cause the display of the user interface device to display a received patient weight.

* * * * *